United States Patent
Muto et al.

(10) Patent No.: US 8,498,791 B2
(45) Date of Patent: Jul. 30, 2013

(54) LOCK-UP CONTROL APPARATUS FOR AUTOMATIC TRANSMISSION

(75) Inventors: Akio Muto, Wako (JP); Masaaki Takamatsu, Wako (JP); Yasuhiro Ijichi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 497 days.

(21) Appl. No.: 12/954,676

(22) Filed: Nov. 26, 2010

(65) Prior Publication Data

US 2011/0130933 A1 Jun. 2, 2011

(30) Foreign Application Priority Data

Nov. 27, 2009 (JP) ................................. 2009-270852

(51) Int. Cl.
*B60W 10/02* (2006.01)

(52) U.S. Cl.
USPC ................. 701/67; 477/39; 477/166; 475/65; 475/157; 475/308; 475/314; 475/320

(58) Field of Classification Search
USPC .................. 701/67, 68; 477/37, 39, 125, 159, 477/166, 169, 171, 173; 475/43, 65, 157, 475/231, 233, 293, 308, 314, 320, 326; 74/34, 74/125.5, 322; 180/292
See application file for complete search history.

(56) References Cited

U.S. PATENT DOCUMENTS

| | | | | |
|---|---|---|---|---|
| 4,787,258 | A | * | 11/1988 | Yamamoto et al. ........... 477/119 |
| 5,919,114 | A | * | 7/1999 | Kamada et al. ............... 477/159 |
| 6,309,324 | B1 | * | 10/2001 | Sawa et al. .................... 477/125 |
| 2001/0021683 | A1 | * | 9/2001 | Takagi et al. ..................... 477/37 |
| 2002/0017413 | A1 | * | 2/2002 | Ochiai et al. .................. 180/178 |
| 2008/0214348 | A1 | * | 9/2008 | Hasegawa et al. .............. 475/80 |
| 2011/0239801 | A1 | * | 10/2011 | Inagaki et al. ............... 74/473.1 |

FOREIGN PATENT DOCUMENTS

JP 2005-321014 11/2005

* cited by examiner

*Primary Examiner* — Mary Cheung
(74) *Attorney, Agent, or Firm* — Ditthavong Mori & Steiner, P.C.

(57) ABSTRACT

A lock-up control apparatus includes a kick-down instruction detector configured to detect a kick-down shift transmission instruction during application of a lock-up clutch. A first lock-up control amount changer is configured to change the lock-up control amount when the kick-down shift transmission instruction is detected. An intermediate gear speed determinator is configured to determine whether the kick-down shift transmission instruction includes an intermediate gear speed shift transmission instruction to an intermediate shift transmission gear speed. A second lock-up control amount changer is configured to change the lock-up control amount when the kick-down shift transmission instruction includes the intermediate gear speed shift transmission instruction. A target gear speed shift transmission instruction detector is configured to detect a target gear speed shift transmission instruction. The third lock-up control amount changer is configured to change the lock-up control amount when the target gear speed shift transmission instruction is detected.

9 Claims, 12 Drawing Sheets

LOCK-UP CONTROL APPARATUS FOR AUTOMATIC TRANSMISSION

CROSS REFERENCES TO RELATED APPLICATIONS

The present application claims priority under 35 U.S.C. §119 to Japanese Patent Application No. 2009-270852, filed Nov. 27, 2009, entitled "Lock-Up Control Apparatus for Automatic Transmission". The contents of this application are incorporated herein by reference in their entirety.

BACKGROUND OF THE INVENTION

1. Field of the Invention

The present invention relates to a lock-up control apparatus for an automatic transmission.

2. Description of the Related Art

Up to now, in a vehicle provided with a torque converter, at the time of travelling, by applying a lock-up clutch (hereinafter, which will be also referred to as "LC") of the torque converter in a predetermined operation area, engine revolutions are suppressed to a low level, and an upgrade in fuel economics (fuel consumption) for the vehicle is implemented. Also, in recent years, in addition to an improvement in the practical fuel economics, as a purpose of providing a direct travelling feeling with respect to a press-down on an accelerator to a driver who is a user, an expansion of an application area of the lock-up clutch is implemented.

However, by expanding the application area of the lock-up clutch, as the frequency of shift transmissions for the automatic transmission is increased in an applied state of the lock-up clutch, a problem of a deterioration in the merchantability for a vehicle due to a shift transmission shock occurs. In particular, in the case of a down shift at a time when an acceleration pedal is strongly pressed down (kick-down shift transmission, which will be hereinafter also referred to as "KD shift transmission"), an engine torque is sharply increased. Also, as this is a shift transmission to a lower gear, the deterioration from the shift transmission shock is still more easily caused.

In order to solve such problems, a lock-up control apparatus for an automatic transmission is proposed for implementing an amelioration of the shift transmission shock by detecting a shift transmission instruction at the time of the kick-down, detecting a transition from a torque layer to an inertia layer after the detection, and gradually decreasing a clutch capacity of the lock clutch after the detection of this transition (lock-up control amount: for example, a duty ratio to a solenoid-operated valve corresponding to the lock-up clutch) (for example, see Japanese Unexamined Patent Application Publication No. 2005-321014).

Incidentally, along with the above-mentioned expansion of the application area of the lock-up clutch, while the lock-up clutch is applied, a shift transmission crossing a plurality of shift transmission gear speeds equal to or more than two gear speeds is also being generated in some cases. However, only a lock-up clutch capacity control similar to a normal KD shift transmission is performed with respect to such a KD shift transmission crossing two shift transmission gear speeds or more, and a special control has not been attempted.

In a case where the KD shift transmission crossing two gear speeds or more is generated, a necessary lock-up clutch capacity varies depending on whether the shift transmission control is a KD shift transmission for one gear speed each (hereinafter, which will be referred to as "continuous KD shift transmission": for example, a continuous shift transmission control of a 5-4 gear speed shift transmission and a 4-3 gear speed shift transmission) or a KD shift transmission for performing a shift transmission while jumping over an intermediate shift transmission gear speed (in this example, fourth gear speed) (hereinafter, which will be referred to as "jumping KD shift transmission": for example, a 5-3 gear speed shift transmission control).

To be more specific, at the time of the continuous KD shift transmission, after the first KD shift transmission control is ended, the next KD shift transmission control is started, and therefore the lock-up clutch capacity control similar to the normal KD shift transmission may be performed. However, at the time of the jumping KD shift transmission, the lock-up clutch capacity needs to be further lowered than that at the time of the continuous KD shift transmission. That is, in the KD shift transmission control in related art, when an intermediate shift transmission gear speed is passed through where a near neutral state is obtained and a transmission torque of the shift transmission clutch is small, a control of gradually increasing a control hydraulic pressure towards the normal lock-up clutch capacity along with an end of the first KD shift transmission control is once started, and thereafter the lock-up clutch capacity is decreased again. For that reason, the lock-up clutch capacity becomes excessive at the time of passing through the intermediate shift transmission gear speed, and problems occur in which the engine is retarded and the shift transmission shock is generated.

SUMMARY OF THE INVENTION

According to one aspect of the present invention, a lock-up control apparatus is for an automatic transmission. The automatic transmission is provided with a lock-up clutch capable of mechanically directly connecting an input side and an output side of a torque converter in accordance with a lock-up control amount that is increased in a predetermined operation area to apply the lock-up clutch. The lock-up control apparatus includes a kick-down instruction detector, a first lock-up control amount changer, an intermediate gear speed determinator, a second lock-up control amount changer, a target gear speed shift transmission instruction detector, and a third lock-up control amount changer. The kick-down instruction detector is configured to detect a kick-down shift transmission instruction during an application of the lock-up clutch. The first lock-up control amount changer is configured to change the lock-up control amount when the kick-down shift transmission instruction is detected by the kick-down instruction detector. The intermediate gear speed determinator is configured to determine whether or not the kick-down shift transmission instruction detected by the kick-down instruction detector is a shift transmission instruction including an intermediate gear speed shift transmission instruction to an intermediate shift transmission gear speed. The second lock-up control amount changer is configured to further change the lock-up control amount in a case where the intermediate gear speed determinator determines that the kick-down shift transmission instruction includes the intermediate gear speed shift transmission instruction. The target gear speed shift transmission instruction detector is configured to detect a target gear speed shift transmission instruction to a target shift transmission gear speed of the kick-down shift transmission instruction from the intermediate shift transmission gear speed determined by the intermediate gear speed determinator. The third lock-up control amount changer is configured to further change the lock-up control amount when the target gear speed shift transmission instruction is detected by the target gear speed shift transmission instruction detector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
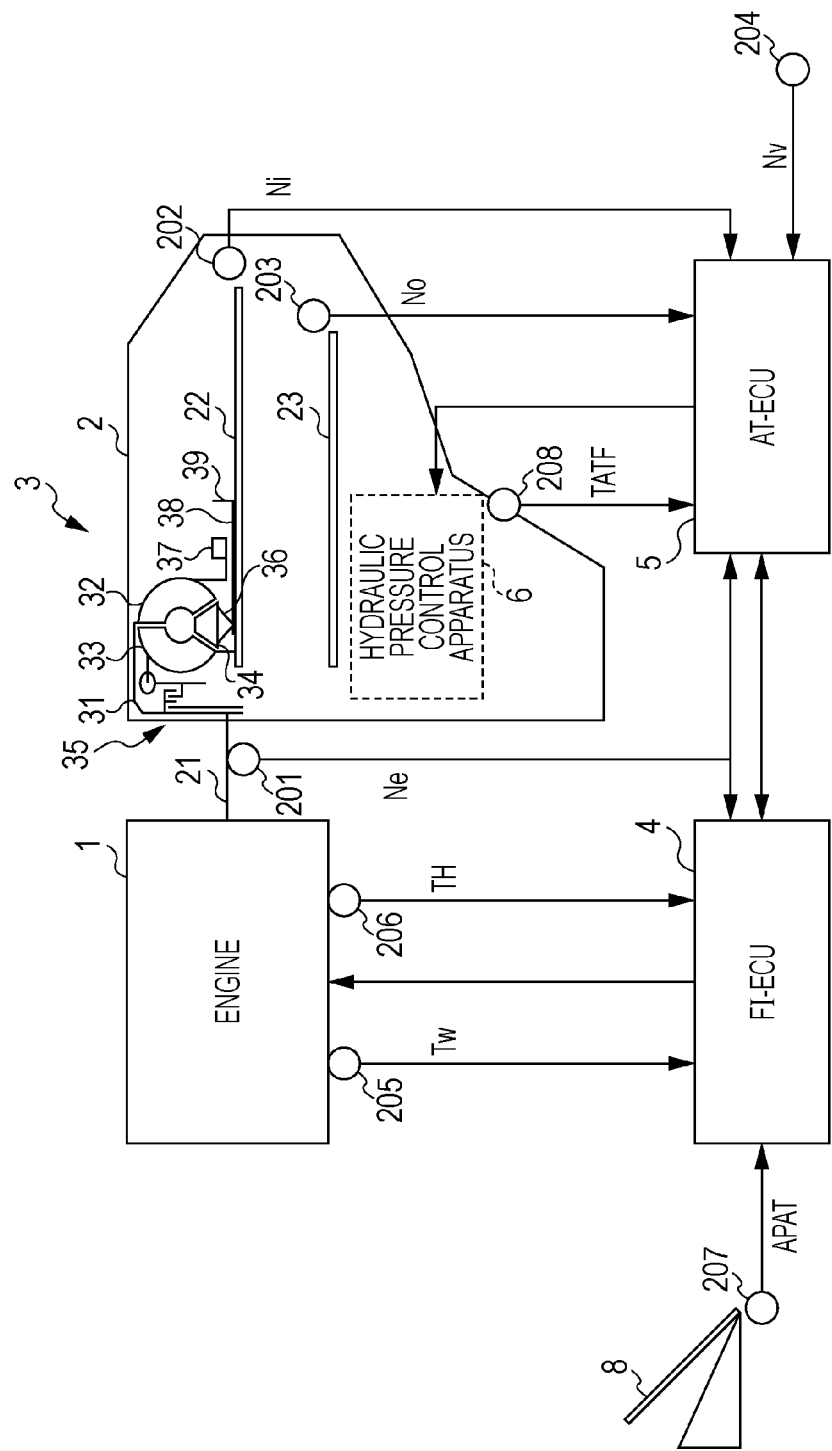
FIG. 1 is a schematic diagram of a drive system of the vehicle to which a lock-up control apparatus for an automatic transmission according to an embodiment of the present invention is applied.

Hereinafter, embodiments of a lock-up control apparatus for an automatic transmission according to the present invention will be described in detail with reference to the accompanying drawings.

It should be noted that reference numerals for the drawings in parenthesis described above are intended to exemplify components for reference corresponding to embodiments which will be described below.

First, a configuration of a vehicle to which a lock-up control apparatus for an automatic transmission according to an embodiment of the present invention is applied will be described. FIG. 1 is a schematic diagram of a drive system of the vehicle to which the lock-up control apparatus for the automatic transmission according to an embodiment of the present invention is applied. As shown in FIG. 1, the vehicle according to the present embodiment is provided with an engine 1, an automatic transmission 2 coupled to the engine 1 via a fluidic torque converter 3, an FI-ECU 4 for controlling the engine 1, an AT-ECU 5 for controlling the automatic transmission 2 including the torque converter 3, and a hydraulic pressure control apparatus 6 for controlling a rotation drive of the torque converter 3, a lock-up control, and application (engagement) and release of a plurality of friction engagement elements of the automatic transmission 2. It should be noted that the lock-up control apparatus for the automatic transmission of the embodiment of the present invention is realized by the AT-ECU 5 as will be described below in FIG. 2.

A rotation output of the engine 1 is output to a crankshaft (an output shaft of the engine 1) 21. This rotation of the crankshaft 21 is transmitted via the torque converter 3 to the main shaft 22 of the automatic transmission 2.

A torque converter 3 is configured to perform a transmission of a torque by way of fluid (hydraulic oil). As shown in FIG. 1, the torque converter 3 has a front cover 31, a pump wheel (pump impeller) 32 integrally formed with the front cover 31, a turbine wheel (turbine runner) 33 arranged between the front cover 31 and the pump wheel 32 so as to oppose the pump wheel 32, and a stator wheel 34 inserted between the pump wheel 32 and the turbine wheel 33 and also supported rotatably on a stator shaft (fixed shaft) 38 via an unidirectional clutch 36. As shown in FIG. 1, the crankshaft 21 is connected via the front cover 31 to the pump wheel 32 of the torque converter 3, and the turbine wheel 33 is connected to a main shaft (an input shaft of the automatic transmission 2) 21.

Also, a lock-up clutch 35 is provided between the turbine wheel 33 and the front cover 31. Under a control of the hydraulic pressure control apparatus 6 based on an instruction of the AT-ECU 5, the lock-up clutch 35 is pressed towards an inner face of the front cover 31 to be engaged (applied) with the front cover 31 and is configured to perform a lock-up control for releasing the engagement with the front cover 31 as the press is released. A container formed by the front cover 31 and the pump wheel 32 is filled with hydraulic oil (ATF: Automatic Transmission Fluid).

In a case where the lock-up control is not effected, relative rotations of the pump wheel 32 and the turbine wheel 33 are allowed. In this state, when a rotation torque of the crankshaft 21 is transmitted via the front cover 31 to the pump wheel 32, the hydraulic oil filling the container of the torque converter 3 circulates from the pump wheel 32 to the turbine wheel 33, and then to the stator wheel 34 due to the rotation of the pump wheel 32. According to this, the rotation torque of the pump wheel 32 is hydrodynamically transmitted to the turbine wheel 33, an amplification effect is carried out during this state, and the main shaft 22 is driven. At this time, the stator wheel 34 bears reactive force thereof (hereinafter, which will be referred to as "stator reactive force").

On the other hand, during the lock-up control, a state is established in which the lock-up clutch 35 is engage, instead of rotating from the front cover 31 to the turbine wheel 33 by way of the hydraulic oil, the front cover 31 and the turbine wheel 33 integrally rotate, and the rotation torque of the crankshaft 21 is directly transmitted to the main shaft 22. That is, in accordance with a lock-up control amount, the crankshaft 21 is mechanically coupled (directly connected) to the main shaft 22 via the lock-up clutch 35.

Figure 3:
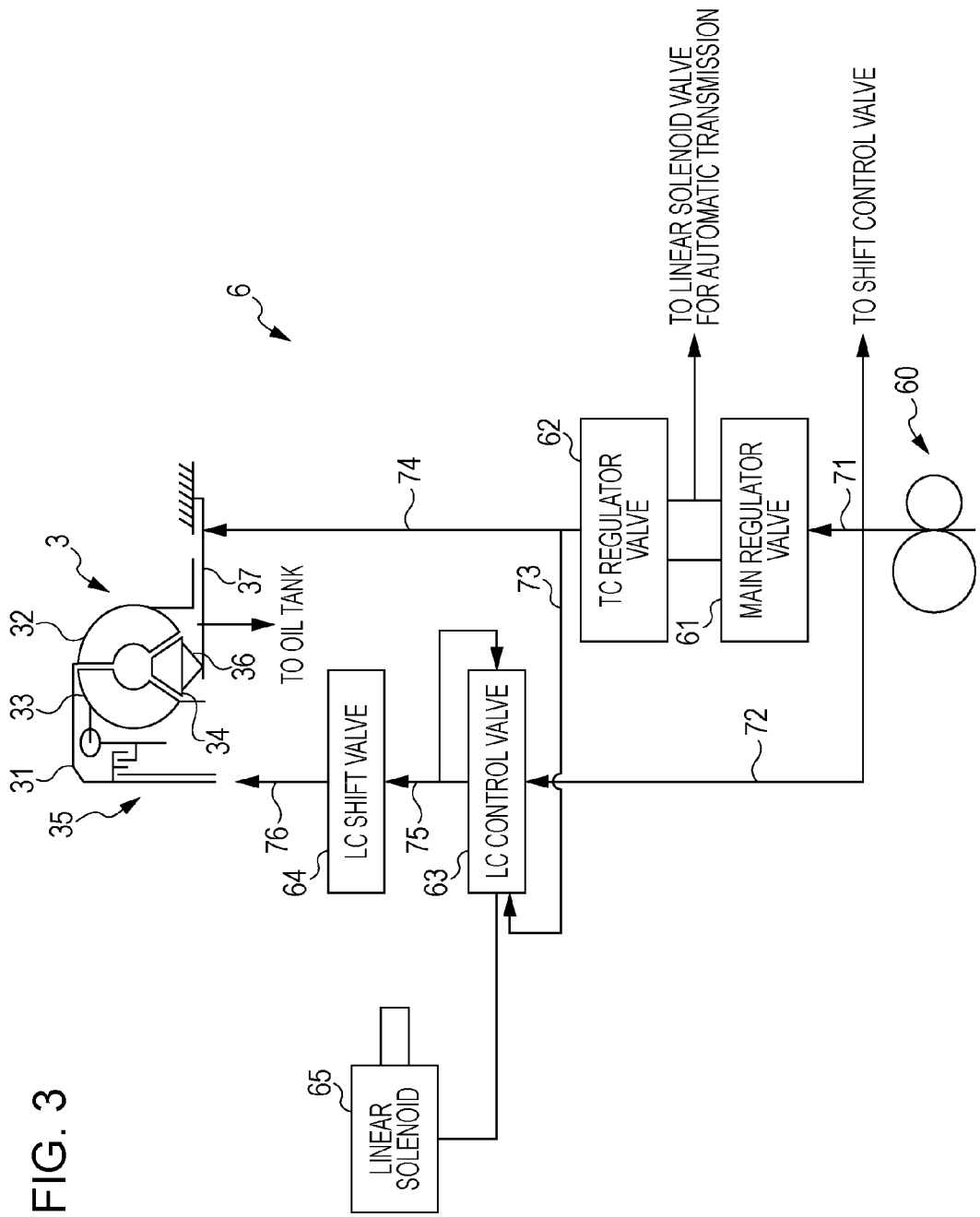
FIG. 3 is a schematic hydraulic pressure circuit diagram of a hydraulic pressure control apparatus shown in FIG. 1.

In FIG. 1, on a right end of the pump wheel 32, a pump drive gearwheel 37 for driving a hydraulic pressure pump 60 shown in FIG. 3 is provided. On a right end of the stator shaft 38, a stator arm 39 for controlling the main regulator valve 61 shown in FIG. 3 when an operational hydraulic pressure (line pressure PL) is at a high line pressure is provided.

The automatic transmission 2 is an automatic transmission for a vehicle, for example, having 6 gear speeds for forward and 1 gear speed for reverse according to the present embodiment. The automatic transmission 2 is provided with a plurality of trains of gears and a plurality of clutches (fraction engagement elements) corresponding to gear speeds, and each of the trains of gears is constituted by a pair of a drive gearwheel and a driven gearwheel. As the configuration of the automatic transmission 2 is not a characteristic part of the embodiment of the present invention, a detailed description by using a skeleton diagram or the like is omitted, but those skilled in the art can appropriately adopt a related-art configuration of the automatic transmission.

A rotation torque of the main shaft 22 is transmitted to a counter shaft 23 via clutches and trains of gears which are not shown in FIG. 1, trains of gears such as a secondary shaft and an idle shaft, and the like. Also, a rotation torque of the counter shaft 23 is transmitted to drive wheels via trains of gears and a differential transmission mechanism which are not shown in FIG. 1.

The hydraulic pressure control apparatus 6 is provided in the automatic transmission 2 while corresponding to the automatic transmission 2 and the torque converter 3. The hydraulic pressure control apparatus 6 supplies the target fraction engagement element (clutch) with the hydraulic oil at the line pressure PL (the operational hydraulic pressure) so as to selectively perform the application and release (engagement operation) of the plurality of fraction engagement elements (clutches) which are not shown in the automatic transmission 2 for setting one shift transmission gear speed of the plurality of shift transmission gear speeds.

Also, the hydraulic pressure control apparatus 6 supplies the pump wheel 32 of the torque converter 3 with the hydraulic oil at the operational hydraulic pressure so as to control a torque converter slip rate ETR indicating to which extent the rotation drive of the crankshaft 21 is transmitted to the main shaft 22 and also supplies an oil chamber which is not shown in the drawing of the lock-up clutch 35 with the hydraulic oil at the operational hydraulic pressure so as to perform a control for the engagement (application) of the lock-up clutch 35 under a predetermined condition such as a cruise travelling of a vehicle.

Furthermore, the hydraulic pressure control apparatus 6 supplies lubricating oil for lubricating the main shaft 22 and the counter shaft 23 and the secondary shaft and the idle shaft which are not shown in the drawing to the main shaft 22, the counter shaft 23, and the like. It should be noted that the secondary shaft and the idle shaft are provided in accordance with the number of shift transmission gear speeds and the shape of the automatic transmission 2.

In a vicinity of the crankshaft 21, a crankshaft revolution number sensor 201 for detecting a number of revolutions Ne of the crankshaft 21 (the engine 1) is provided. In a vicinity of the main shaft 22, a main shaft revolution number sensor 202 for detecting a number of revolutions Ni (input shaft revolution number of the automatic transmission 2) of the main shaft 22 is provided. In a vicinity of the counter shaft 23, a counter shaft revolution number sensor 203 for detecting a number of revolutions No of the counter shaft 23 (output shaft revolution number of the automatic transmission 2) is provided. Revolution number data detected by the respective revolution number sensors 201 to 203 is output to the AT-ECU 5. Also, the revolution number data detected by the crankshaft revolution number sensor 201 is also output to the FI-ECU 4.

Also, at a predetermined position of the vehicle, a vehicle speed sensor 204 for detecting a vehicle speed Nv of the vehicle is provided. Vehicle speed data detected by the vehicle speed sensor 204 is output to the AT-ECU 5. It should be noted that instead of providing the vehicle speed sensor 204 for dedicatedly detecting the vehicle speed Nv, the vehicle speed Nv may be calculated from the number of revolutions Ni of the main shaft 22 or the number of revolutions No of the counter shaft 23. For example, on the basis of a relational expression such as "Nv=Ni×shift transmission ratio×tire circumferential length" or "Nv=No×tire circumferential length", the vehicle speed Nv can be detected (calculated).

In a vicinity of the engine 1, a coolant water temperature sensor 205 for detecting a temperature Tw of engine coolant water for cooling the engine 1 and a throttle opening angle sensor 206 for detecting an opening angle TH of a throttle which is not shown in the drawing of the engine 1 are provided. Temperature data on the engine coolant water detected by the coolant water temperature sensor 205 and throttle opening angle data detected by the throttle opening angle sensor 206 are output to the FI-ECU 4.

In a vicinity of an accelerator pedal 8, an acceleration pedal opening angle sensor 207 which is coupled to the accelerator pedal 8 by a wire or the like which is not shown in the drawing and configured to detect an opening angle of the accelerator pedal 8 (acceleration pedal opening angle) APAT is provided. Acceleration pedal opening angle data detected by the acceleration pedal opening angle sensor 207 is output to the FI-ECU 4.

Also, in a vicinity of an oil tank which is not shown in the drawing in the hydraulic pressure control apparatus 6, an oil temperature sensor 208 for detecting a temperature TATF of the hydraulic oil of the hydraulic pressure control apparatus 6 (and lubricating oil) is provided. Data on the temperature of the hydraulic oil (oil temperature) detected by the oil temperature sensor 208 is output to the AT-ECU 5.

On the basis of the detection data input from the respective sensors 201 and 205 to 207 and the various data input from the AT-ECU 5, the FI-ECU 4 is configured to control the output of the engine 1, that is, the number of revolutions Ne of the engine 1. Also, on the basis of the detection data input from the respective sensors 201 to 204 and 208 and the various data input from the FI-ECU 4, the AT-ECU 5 controls a valve group which will be described below in the hydraulic pressure control apparatus 6 to perform the engagement of one of the plurality of fraction engagement elements (clutches). Furthermore, the AT-ECU 5 is configured to increase the lock-up control amount via the hydraulic pressure control apparatus 6 in a predetermined operation area to perform the engagement of the lock-up clutch 35.

Figure 2:
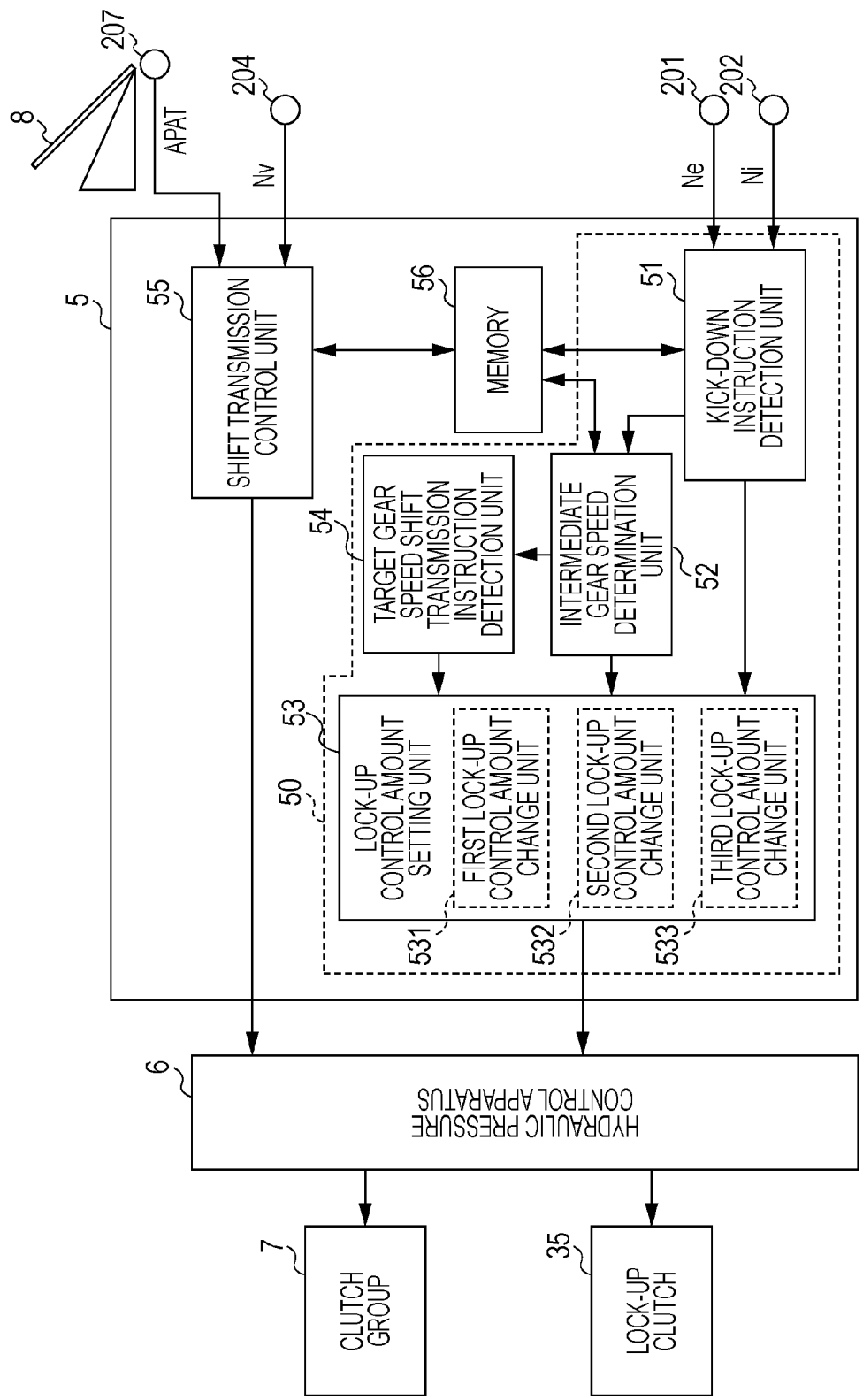
FIG. 2 is a functional block diagram of an AT-ECU shown in FIG. 1.

Next, a configuration (function) of the AT-ECU 5 according to the present embodiment will be described. FIG. 2 is a functional block diagram of the AT-ECU 5 shown in FIG. 1. As shown in FIG. 2, the AT-ECU 5 according to the present embodiment is provided with a lock-up control apparatus 50, a shift transmission controller 55 constituting a shift transmission control apparatus, and a memory 56.

The lock-up control apparatus 50 according to the present embodiment is provided with a kick-down instruction detector 51, an intermediate gear speed determinator 52, a lock-up control amount setter 53, and a target gear speed shift transmission instruction detector 54. Also, the lock-up control amount setter 53 is provided with a first lock-up control amount changer 531 and a second lock-up control amount changer 532.

On the basis of detection data input from the respective sensors 201 to 204 and 208 and various data input from the FI-ECU 4, the shift transmission controller 55 switches shift transmission maps stored in the memory 56. Also, in accordance with a travelling state of the vehicle, the shift transmission controller 55 obtains the vehicle speed data detected by the vehicle speed sensor 204 and the opening angle data of the accelerator pedal 8 detected by the acceleration pedal opening angle sensor 207. Then, on the basis of the set shift-transmission shift map and the vehicle speed Nv and the acceleration pedal opening angle APAT thus obtained, the shift transmission controller 55 decides the shift transmission gear speed or execute the shift transmission control to control a clutch group 7 via the hydraulic pressure control apparatus 6.

According to the present embodiment, on the basis of the shift-transmission shift map, the vehicle speed Nv, and the acceleration pedal opening angle APAT, the shift transmission controller 55 determines whether or not a kick-down operation is performed by the driver. In a case where the kick-down operation is performed, as will be described below, a kick-down flag stored in the memory 56 is set as 1, and also a kick-down shift transmission instruction is output to the hydraulic pressure control apparatus 6 of the automatic transmission 2 so as to perform the kick-down shift transmission.

On the basis of the number of revolution Ne of the crankshaft 21 and the number of revolutions Ni of the main shaft 22 obtained from the crankshaft revolution number sensor 201 and the main shaft revolution number sensor 202, the kick-down instruction detector 51 calculates the torque converter slip rate ETR to determine whether or not the lock-up clutch 35 is currently applied. Then, in a case where the lock-up clutch 35 is applied, on the basis of the value of the kick-down flag stored in the memory 56, the kick-down instruction detector 51 detects that the shift transmission controller 55 outputs the kick-down shift transmission instruction.

When the kick-down shift transmission instruction is detected by the kick-down instruction detector 51, the first lock-up control amount changer 531 changes the lock-up control amount of the lock-up clutch 35. To be more specific, along with the start of the kick-down control by the shift transmission controller 55, the first lock-up control amount changer 531 decreases the lock-up control amount of the lock-up clutch 35. At this time, according to the present embodiment, as the lock-up control amount for performing the lock-up control on the lock-up clutch 35, a correction coefficient KDN indicating how much the control hydraulic pressure is decreased with respect to the normal application of the lock-up clutch 35 is used.

The intermediate gear speed determinator 52 determines whether or not the kick-down shift transmission instruction detected by the kick-down instruction detector 51 is a shift transmission instruction including an intermediate gear speed shift transmission instruction to an intermediate shift transmission gear speed. To be more specific, on the basis of a state in which the gear ratio of the automatic transmission 2 (shift transmission ratio) GRATIO is equal to or smaller than a predetermined threshold, the intermediate gear speed determinator 52 determines that the kick-down shift transmission instruction includes an intermediate gear speed shift transmission instruction. It should be noted that when the intermediate gear speed determinator 52 determines that the intermediate gear speed shift transmission instruction is included, an intermediate gear speed determination flag stored in the memory 56 is set as 1.

At this time, in a predetermined shift transmission characteristic (shift-transmission shift map), on the basis of whether or not the kick-down shift transmission instruction is a shift transmission instruction crossing a down shift line including an intermediate shift transmission gear speed, the intermediate gear speed determinator 52 determines whether or not the kick-down shift transmission instruction is a shift transmission instruction including the intermediate gear speed shift transmission instruction. For example, in the shift-transmission shift map shown in FIG. 6, in the case of a kick-down shift transmission instruction from a vehicle speed and an acceleration pedal opening angle indicated at a point A to a vehicle speed and an acceleration pedal opening angle indicated at a point C, two down shift lines of a 5-4 down shift line and a 4-3 down shift line are crossed. In this case, the intermediate gear speed determinator 52 determines that the intermediate gear speed shift transmission instruction is included.

In a case where the intermediate gear speed determinator 52 determines that the kick-down shift transmission instruction includes the intermediate gear speed shift transmission instruction, the second lock-up control amount changer 532 further changes the lock-up control amount. To be more specific, along with the determination by the intermediate gear speed determinator 52 on the intermediate gear speed shift transmission instruction, the second lock-up control amount changer 532 further decreases the lock-up control amount of the lock-up clutch 35 as compared with the case of the first lock-up control amount changer 531.

The target gear speed shift transmission instruction detector 54 detects a target gear speed shift transmission instruction to a target shift transmission gear speed of the kick-down shift transmission instruction from the intermediate shift transmission gear speed determined by the intermediate gear speed determinator 52. To be more specific, the target gear speed shift transmission instruction detector 54 monitors and detects the shift transmission instruction from the intermediate shift transmission gear speed to the target shift transmission gear speed which is output from the shift transmission controller 55 to the hydraulic pressure control apparatus 6, that is, the target gear speed shift transmission instruction.

It should be noted that the target gear speed shift transmission instruction detector 54 is configured to monitor a shift transmission ratio GRATIO (gear ratio) of the automatic transmission 2 and detect the target gear speed shift transmission instruction on the basis of this gear ratio becomes equal to or smaller than the gear ratio of the intermediate shift transmission gear speed.

A third lock-up control amount changer 533 further changes the lock-up control amount when the target gear speed shift transmission instruction detector 54 detects the target gear speed shift transmission instruction. To be more specific, the third lock-up control amount changer 533 is configured to gradually return the lock-up control amount to the value at the time of the normal application in a predetermined period from a time when the target gear speed shift transmission instruction detector 54 detects the target gear speed shift transmission instruction to a time when the target shift transmission gear speed is realized on the basis of a state in which the intermediate gear speed determination flag stored in the memory 56 becomes 0 so that the lock-up control amount set by the second lock-up control amount changer 532 becomes the target lock-up control amount set at the target shift transmission gear speed.

Next, with reference to FIG. 3, configurations of the automatic transmission 2 and the hydraulic pressure control apparatus 6 for controlling the hydraulic oil of the torque converter 3 will be described. FIG. 3 is a block diagram showing a part of the hydraulic pressure control apparatus 6 of the torque converter 3 according to the present embodiment.

As shown in FIG. 3, the hydraulic pressure control apparatus 6 includes the hydraulic pressure pump 60 for supplying the hydraulic oil to the entirety of the hydraulic pressure control apparatus 6. The hydraulic pressure pump 60 is driven by the engine 1 to pump the hydraulic oil retained in the oil tank which is not shown in the drawing and pressurize and feed the hydraulic oil pumped via an oil path 71 to the main regulator valve 61.

The main regulator valve 61 is configured to generate the line pressure PL by regulating the pressure of the hydraulic oil pressurized and fed from the hydraulic pressure pump 60. The hydraulic oil at the line pressure PL regulated by the main regulator valve 61 is supplied to a torque converter (TC) regulator valve 62 and also supplied to a linear solenoid valve which is not shown in the drawing used for the automatic transmission 2 and a linear solenoid valve 65 used for the lock-up clutch 35.

Also, the hydraulic oil at the line pressure PL regulated by the main regulator valve 61 is supplied to a CR valve which is not shown in the drawing. The CR valve decreases the line pressure PL of the hydraulic oil to generate a CR pressure (control hydraulic pressure) to supply the respective linear solenoid valves (electromagnetic valves) 65 and the like with the hydraulic oil at the CR pressure.

The TC regulator valve 62 is configured to control the supply of the hydraulic oil to the torque converter 3 and the hydraulic oil at the line pressure PL supplied from the main regulator valve 61 via an oil path 73 to a lock-up (LC) control valve 63. Also, the TC regulator valve 62 supplies the hydraulic oil at the line pressure PL via an oil path 74 to the inside of the torque converter 3 from a back face side.

In accordance with the control hydraulic pressure of the TC regulator valve 62, an LC control valve 63 supplies the hydraulic oil at the line pressure PL supplied via an oil path 72 to an LC shift valve 64 via an oil path 75. The thus supplied hydraulic oil at the line pressure PL is used for the lock-up control on the torque converter 3 via the LC shift valve 64.

The LC shift valve 64 is configured to control the application (ON) and release (OFF) of the lock-up clutch 35 by an (electromagnetic) ON/OFF solenoid valve which is not shown in the drawing. When the LC shift valve 64 is released as the ON/OFF solenoid valve is turned ON, the hydraulic oil is supplied via the LC shift valve 64 and an oil path 76 from the front face side of the lock-up clutch 35, and the hydraulic oil is discharged to the oil tank from the back face side of the lock-up clutch 35. According to this, the lock-up clutch 35 is engaged (applied).

On the other hand, when the LC shift valve 64 is closed by turning the ON/OFF solenoid valve OFF and the hydraulic oil is discharged to the oil tank from the front side, the lock-up clutch 35 is released (unapplied). A slip amount of the lock-up clutch 35 (a slip ratio ETR of the torque converter 3), that is, an engagement capacity at a time when the torque converter 3 is slipped between the engagement (at the time of lock-up) and the release is decided by the pressure of the hydraulic oil (hydraulic pressure) supplied on the front face side and the back face side.

The linear solenoid valve 65 for the LC generates an output pressure decided in accordance with an excitation control of a solenoid coil which is not shown in the drawing to be affected on the LC control valve 63. According to this, the hydraulic oil at the line pressure PL supplied from the main regulator valve 61 is regulated to a pressure necessary for the lock-up control in the LC control valve 63. According to this, the engagement capacity (slipping amount) of the lock-up clutch 35 is adjusted (controlled) on the basis of the excitation or non-excitation of the solenoid coil of the linear solenoid valve 65.

It should be noted that when the engagement state of the lock-up clutch 35 is cancelled (that is, when the lock-up control is turned OFF), the instruction value of the linear solenoid valve 65 is set as 0 to close the LC control valve 63, and also the ON/OFF solenoid valve for switching the opening and closing of the LC shift valve 64 is turned OFF.

Figure 4:
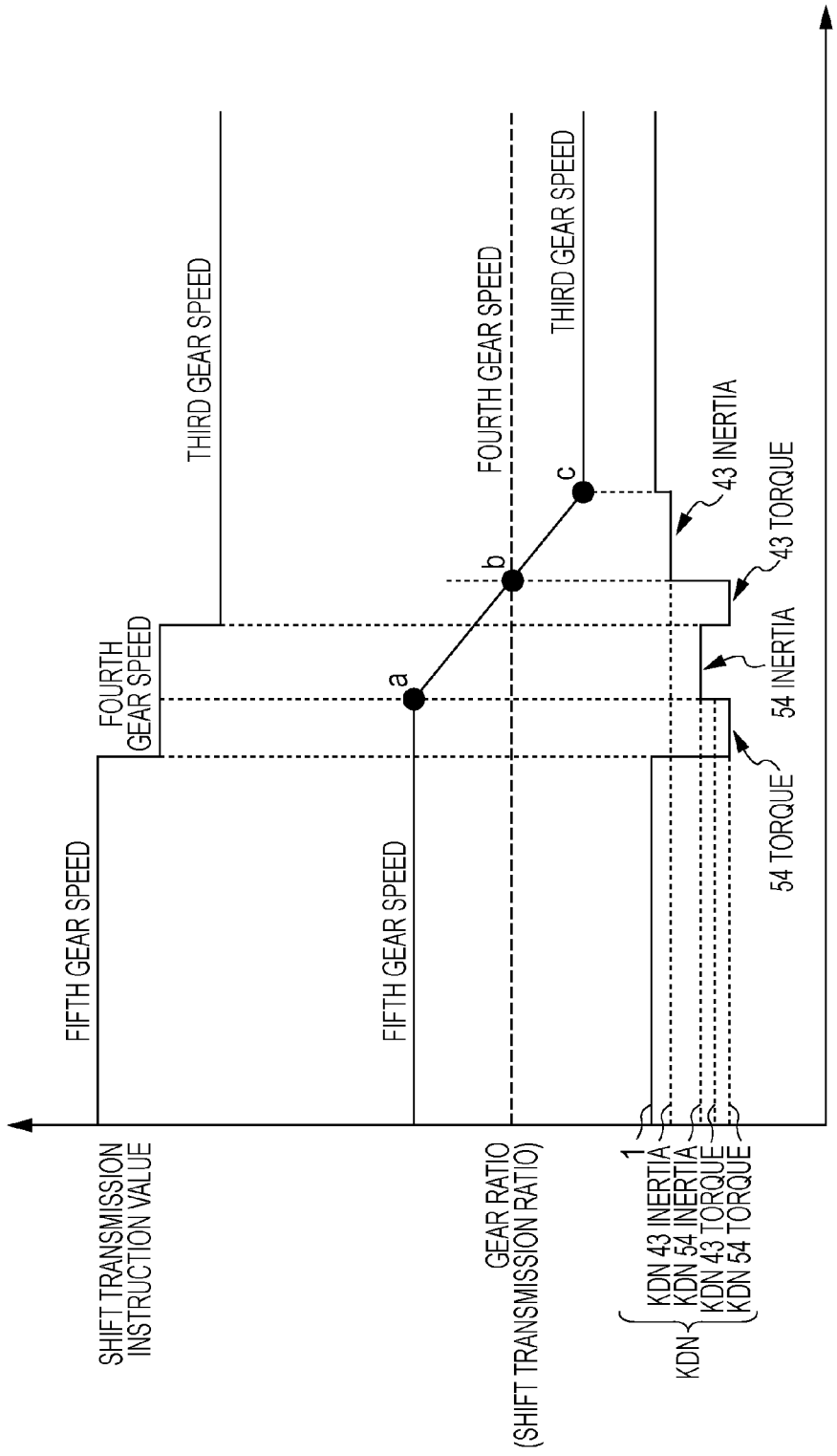
FIG. 4 is a timing chart for a jumping kick-down control in related art.
Figure 5:
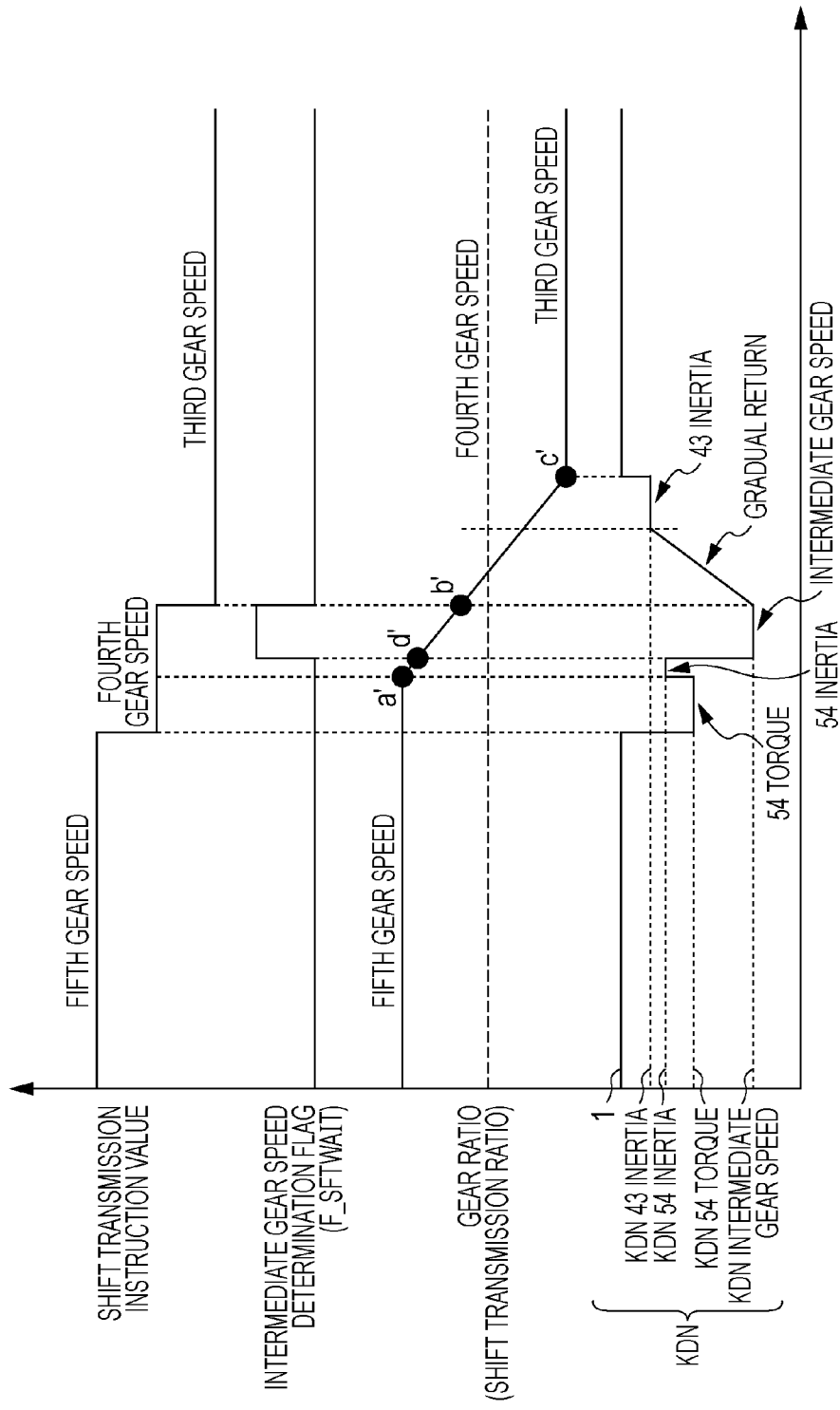
FIG. 5 is a timing chart for a jumping kick-down control according to the embodiment of the present invention.
Figure 6:
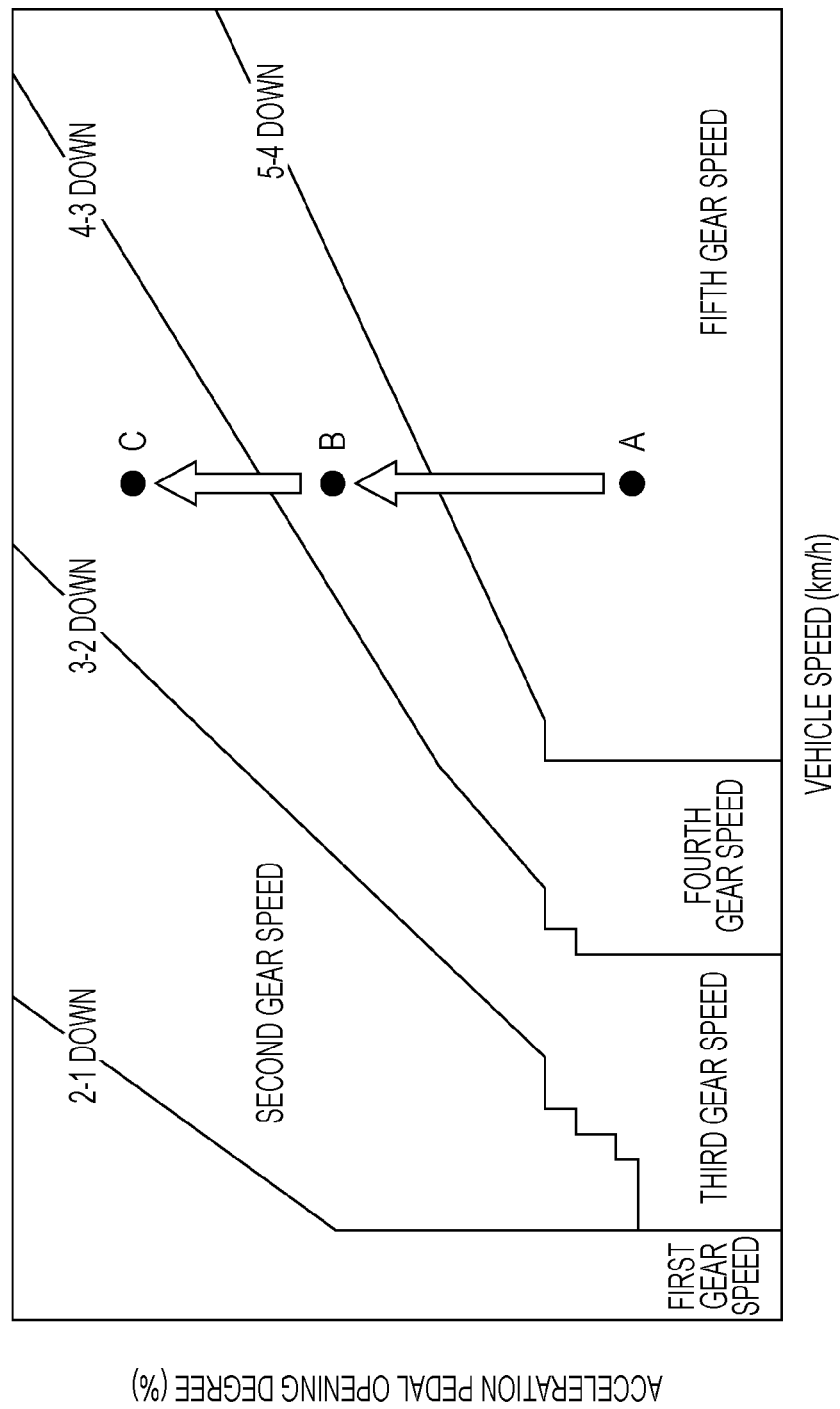
FIG. 6 shows an example of a down-shift shift-transmission shift map.

Next, an operation of a kick-down shift transmission control (hereinafter, which will be also referred to as "jumping kick-down (KD) control") including the intermediate shift transmission gear speed in the lock-up control apparatus 50 of the automatic transmission 2 according to the embodiment of the present invention will be described. It should be noted that in order to compare the control according to the embodiment of the present invention with a control in related art, a description will also be given of the control in related art. FIG. 4 is a timing chart for a jumping kick-down control in related art. FIG. 5 is a timing chart for a jumping kick-down control according to the embodiment of the present invention. FIG. 6 shows an example of a down-shift shift-transmission shift map according to the present embodiment.

First, by using the timing chart of FIG. 4, a jumping kick-down control in related art will be described. While the vehicle is travelling at the fifth gear speed, as shown in FIG. 6, when the driver performs the kick-down operation from the vehicle speed and the acceleration pedal opening angle indicated at the point A to the vehicle speed and the acceleration pedal opening angle indicated at the point C, the kick-down control crossing the two down-shift lines, that is, the 5-4 down-shift line and the 4-3 down-shift line is executed. In response to the start of this kick-down control, the shift transmission instruction value is changed from the current fifth gear speed to the fourth gear speed, and the correction coefficient KDN is changed from 1 (at the time of the normal application) to a correction coefficient KDN 54 torque for a 5-4 kick-down torque phase. According to this, the lock-up control hydraulic pressure is decreased, and the number of revolutions Ne of the engine 1 is increased.

Subsequently, at the time point A, if the gear ratio (shift transmission ratio) dips below a 54 KD inertia phase threshold, in order to apply the lock-up clutch 35 again, the correction coefficient KDN is changed from the KDN 54 torque to a correction coefficient KDN 54 inertia for the 5-4 kick-down inertia phase. According to this, the lock-up control hydraulic pressure is increased.

Subsequently, the shift transmission instruction value is changed from the fourth gear speed to the third gear speed, and a 4-3 shift transmission control is started. Then, the correction coefficient KDN is changed from the KDN 54 inertia to a correction coefficient KDN 43 torque for a 4-3 kick-down torque phase. According to this, the lock-up control hydraulic pressure is decreased again, and the number of revolutions Ne of the engine 1 is increased.

Subsequently, at the time point b, if the gear ratio dips below a 43 KD inertia phase threshold, in order to apply the lock-up clutch 35 again, the correction coefficient KDN is changed from the KDN 43 torque to a correction coefficient KDN 43 inertia for a 4-3 kick-down inertia phase. According to this, the lock-up control hydraulic pressure is increased.

Finally, at the time point c, if the gear ratio reaches a 43 KD end determination threshold, the kick-down control is ended, and the correction coefficient KDN is returned from the KDN 43 inertia to the lock-up control hydraulic pressure which is the hydraulic pressure necessary for applying the lock-up clutch 35 (that is, the correction coefficient KDN is returned to 1), and this KD control is ended.

In this manner, in the control in related art, even in the case of the jumping KD control, without performing the determination on the intermediate shift transmission gear speed, the control on the application and non-application of the lock-up clutch 35 is performed as if the control is constantly the normal kick-down control, that is, the kick-down control for one gear speed. Then, at the time point A, towards the end of the KD control, such a control is carried out that the lock-up control hydraulic pressure is increased. For that reason, even when the lock-up control hydraulic pressure is intended to be decreased at a time when the shift transmission instruction value is changed from the fourth gear speed to the third gear speed, the response of the hydraulic pressure is not ready, and problems occurs in which the engine 1 is retarded and the shift transmission shock is generated because of too much capacity of the lock-up clutch 35.

Next, by using the timing chart of FIG. 5, the jumping kick-down control according to the embodiment of the present invention will be described. Similarly, as in the case of the jumping kick-down control in related art, while the vehicle is travelling at the fifth gear speed, as shown in FIG. 6, the driver performs the kick-down operation from the vehicle speed and the acceleration pedal opening angle indicated at the point A to the vehicle speed and the acceleration pedal opening angle indicated at the point C, and the kick-down control crossing the two down-shift lines is executed. In response to the start of this kick-down control, the shift transmission instruction value is changed from the current fifth gear speed to the fourth gear speed, and the correction coefficient KDN is changed from 1 (at the time of the normal application) to the correction coefficient KDN 54 torque for the 5-4 kick-down torque phase. According to this, the lock-up control hydraulic pressure is decreased, and the number of revolutions Ne of the engine 1 is increased.

Subsequently, at a time point a', if the gear ratio (shift transmission ratio) dips below the 54 KD inertia phase threshold, in order to apply the lock-up clutch 35 again, the correction coefficient KDN is changed from the KDN 54 torque to the correction coefficient KDN 54 inertia for the 5-4 kick-down inertia phase. According to this, the lock-up control hydraulic pressure is increased.

Subsequently, at a time point d', if the gear ratio (shift transmission ratio) dips below the threshold for the intermediate shift transmission gear speed determination, the intermediate gear speed determination flag is ON, and the correction coefficient KDN is changed from the KDN 54 inertia to the correction coefficient KDN intermediate gear speed for the intermediate gear speed. According to the control in related art, the KDN 54 inertia continues as the correction coefficient KDN. On the other hand, according to the embodiment of the present invention, when the intermediate shift transmission gear speed determination is carried out, it is determined that the kick-down control continues, and the correction coefficient KDN is further decreased from the KDN 54 inertia to the KDN intermediate gear speed. According to this, the retard of the engine 1 and the generation of the shift transmission shock in the KD control which are the problems in related art can be effectively prevented.

Subsequently, at a time point b', if the gear ratio dips below an intermediate gear speed determination flag reset threshold, the intermediate gear speed determination flag is reset, and also the shift transmission instruction value is changed from the fourth gear speed to the third gear speed. Then, after a correction return setting time for transiting from the KDN intermediate gear speed to the previously set KDN 43 inertia is decided, as to the correction coefficient KDN, a control is carried out so as to gradually (linearly) return (increase) from the KDN intermediate gear speed to the KDN 43 inertia while corresponding to this correction return setting time. Then, after the elapse of the correction return setting time, the correction coefficient KDN is held to the KDN 43 inertia.

Finally, at a time point c', if the gear ratio reaches the 43 KD end determination threshold, the kick-down control is ended, and the correction coefficient KDN is returned from the KDN 43 inertia to the lock-up control hydraulic pressure which is the hydraulic pressure necessary for applying the lock-up clutch 35 (that is, the correction coefficient KDN is returned to 1), and this KD control is ended.

In this manner, in the jumping KD control according to the embodiment of the present invention, the determination on the intermediate shift transmission gear speed is performed, and in a case where it is determined that the KD control continues, the control is carried out so that the correction coefficient KDN is decreased from the KDN 43 inertia to the KDN intermediate gear speed. According to this, also when the gear ratio is near to the intermediate shift transmission gear speed (passing through the intermediate shift transmission gear speed), the retard of the engine 1 and the generation of the KD shift transmission shock can be effectively prevented.

Figure 7:
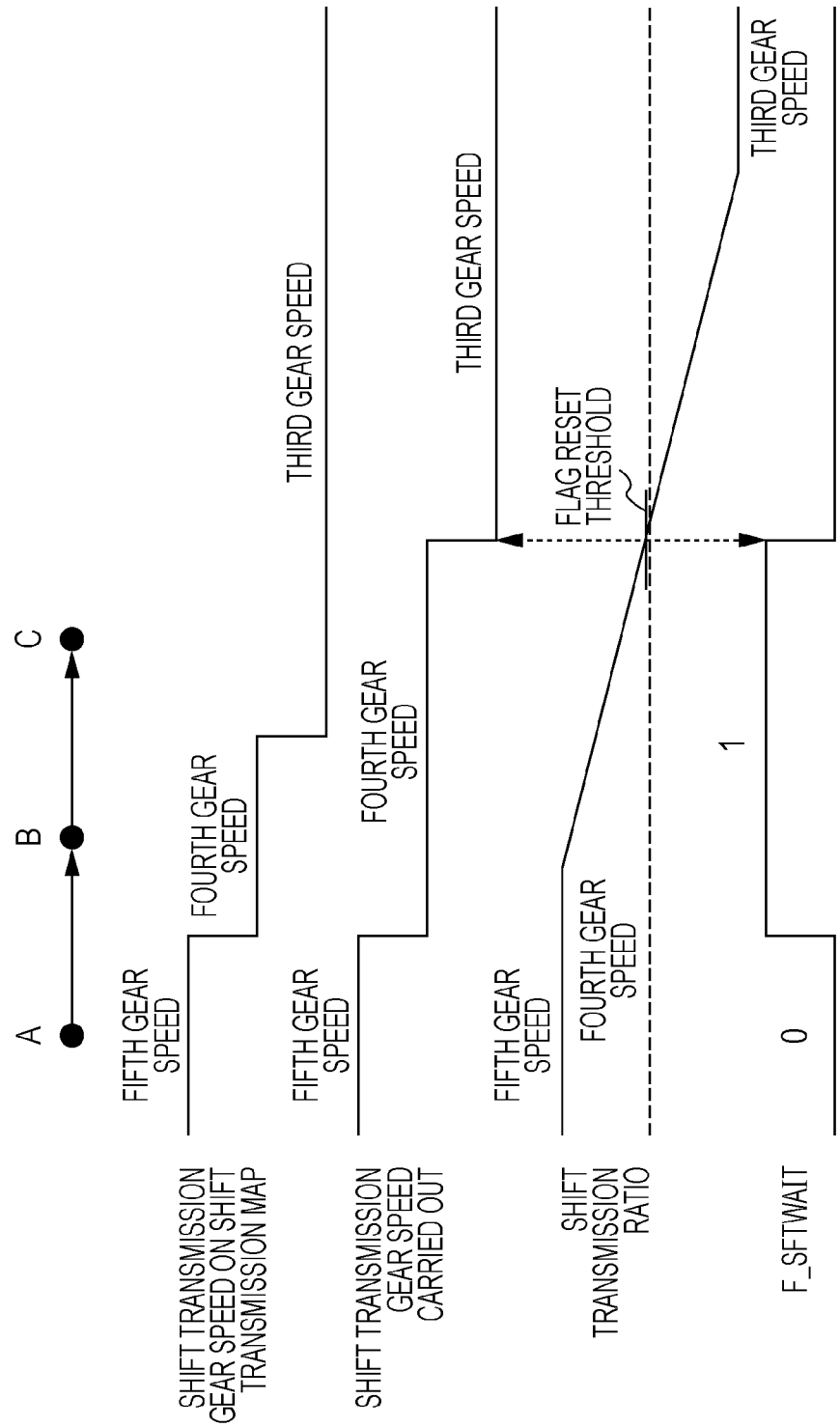
FIG. 7 is a timing chart showing a relation between shift transmission gear speeds, a shift transmission ratio, and intermediate gear speed determination flags at the respective time points on the shift-transmission shift map.

It should be noted that a relation between shift transmission gear speeds, a shift transmission ratio, and intermediate gear speed determination flags F_SFTWAIT at time points A, B, and C on the shift-transmission shift map of FIG. 6 is illustrated in a timing chart of FIG. 7. In the timing chart of FIG. 7, a relation between the flag reset threshold and the gear ratio (shift transmission ratio) is also illustrated.

Figure 8:
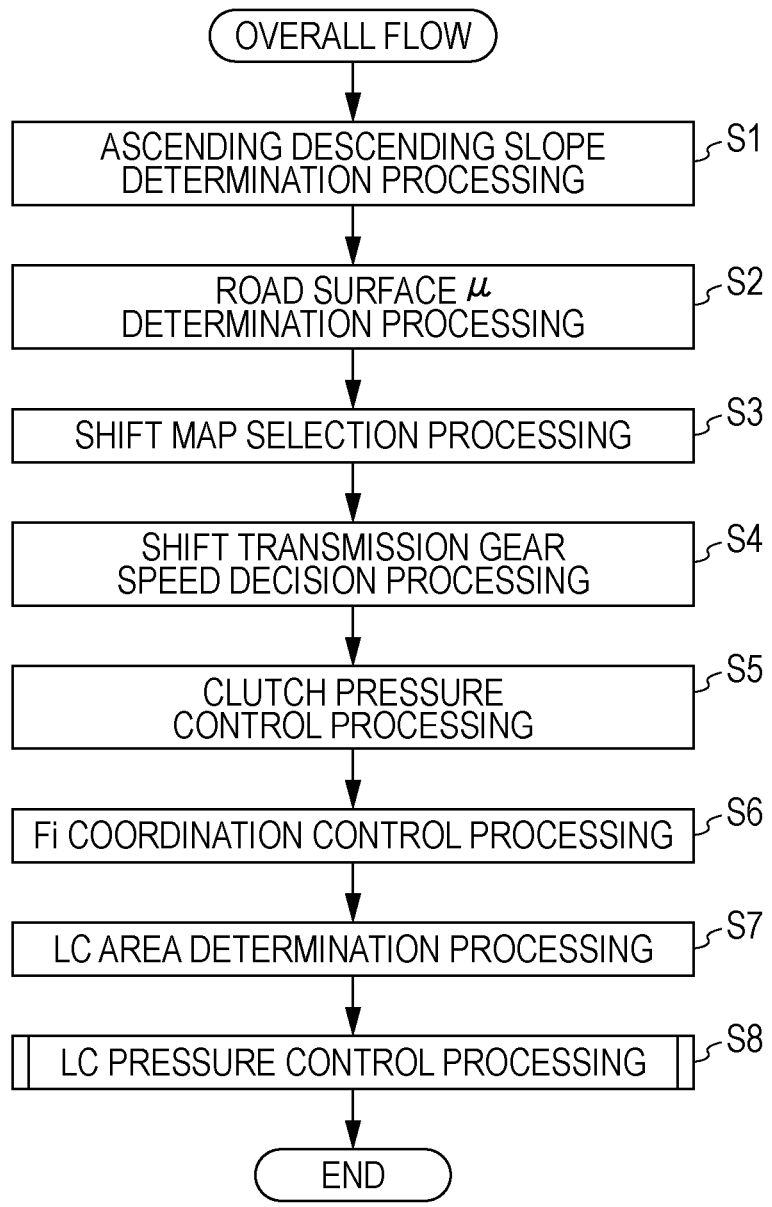
FIG. 8 is a flow chart showing an overall flow of a shift transmission decision sequence for an AT-ECU according to an embodiment of the present invention.

Next, with reference to a flow chart of FIG. 8, an overall flow of the AT-ECU 5 of the automatic transmission 2 according to the present embodiment will be described. FIG. 8 is the flow chart showing an overall flow of a shift transmission decision sequence for the AT-ECU 5 according to the present embodiment. This overall flow is carried out every predetermined time during the travelling of the vehicle.

First, the AT-ECU 5 executes an ascending descending slope determination (step S1). That is, the AT-ECU 5 identifies a normative acceleration on the map stored in the memory 56 of the AT-ECU 5 on the basis of the vehicle speed Nv and the engine load (a throttle opening degree TH detected by the throttle opening angle sensor 206) and estimates the ascending descending slope degree (gradient) in accordance with a difference between the identified normative acceleration and the actual acceleration. At this time, the AT-ECU 5 determines that the vehicle is travelling on a flat road when the actual acceleration is approximately matched with the normative acceleration, that the vehicle is travelling on the descending slope road when the actual acceleration exceeds the normative acceleration, and that the vehicle is travelling on the ascending slope road when the actual acceleration is smaller than the normative acceleration. In this manner, by comparing the normative acceleration with the actual acceleration, the ascending descending slope determination on the vehicle travelling road can be performed without using a gradient sensor.

Subsequently, the AT-ECU 5 executes a road surface µ determination processing (step S2). That is, the AT-ECU 5 determines on a µ state of the road surface on the basis of the vehicle speed Nv detected by the vehicle speed sensor 204, wheel speeds Nw of the respective wheels detected by a wheel speed sensor which is not shown in the drawing, the acceleration pedal opening angle APAT detected by the acceleration pedal opening angle sensor 207, a position of a shift lever (lever operation) detected by a shift lever position sensor which is not shown in the drawing, an ascending descending slope degree estimated in step S1 (estimated gradient), and the like.

Subsequently, the AT-ECU 5 executes a shift map selection processing (step S3). That is, on the basis of the currently set shift transmission gear speed in the automatic transmission 2, the above-mentioned ascending descending slope degree, the acceleration operation, a brake operation detected by a brake sensor which is not shown in the drawing, and the like, the AT-ECU 5 selects one shift-transmission shift map suitable to the travelling road among the plural types of shift-transmission shift maps stored in the memory 56. According to the present embodiment, the AT-ECU 5 also executes the setting and clearing of the intermediate gear speed determination flag in the determination on the intermediate shift transmission gear speed in this shift map selection processing (see a flow chart of FIG. 9).

Subsequently, the AT-ECU 5 executes a shift transmission gear speed decision processing (step S4). That is, the AT-ECU 5 decides a final shift transmission gear speed while also taking into account an operation of the shift lever, a shift transmission prohibition condition, and the like by using the shift-transmission shift map selected in step S3 as a reference.

Subsequently, the AT-ECU 5 executes a clutch pressure control processing (step S5). That is, by controlling the hydraulic pressure control apparatus 6, on the basis of the shift transmission gear speed decided in step S4, the AT-ECU 5 controls the clutch pressure at this shift transmission gear speed and controls the hydraulic pressure control apparatus 6 so as to apply the final shift transmission gear speed.

Subsequently, the AT-ECU 5 executes an Fi coordination control processing (step S6). That is, the AT-ECU 5 controls the input torque at the time of the setting of the final shift transmission gear speed in a coordinated manner with the control on the engine 1.

Subsequently, the AT-ECU 5 executes an LC area determination processing (step S7). That is, on the basis of the ascending descending slope degree estimated in step S1, the final shift transmission gear speed decided in step S4, the acceleration operation, the brake operation, and the like, the AT-ECU 5 decides an LC (lock-up) control on the torque converter 3. As a decision on this LC control, on the basis of the throttle opening degree TH detected by the throttle opening angle sensor 206 and the vehicle speed Nv detected by the vehicle speed sensor 204, it is determined whether or not this is a lock-up available area, and in accordance with the determination result, whether the LC is turned OFF, is for a slip control (acceleration or deceleration), is for a tight control (ON control of the LC), or the like.

Finally, the AT-ECU 5 executes an LC pressure control processing (step S8). That is, on the basis of the LC control determined in step S7, the AT-ECU 5 controls the supply hydraulic pressure to the lock-up clutch (LC) 35 set in the hydraulic pressure control apparatus 6. When this LC pressure control processing is ended, the AT-ECU 5 ends the overall flow of the shift transmission gear speed decision sequence and stands by until a timing for executing the next processing. It should be noted that the LC pressure control processing which is characteristic according to the embodiment of the present invention will be described below on the basis of FIG. 10.

Figure 9:
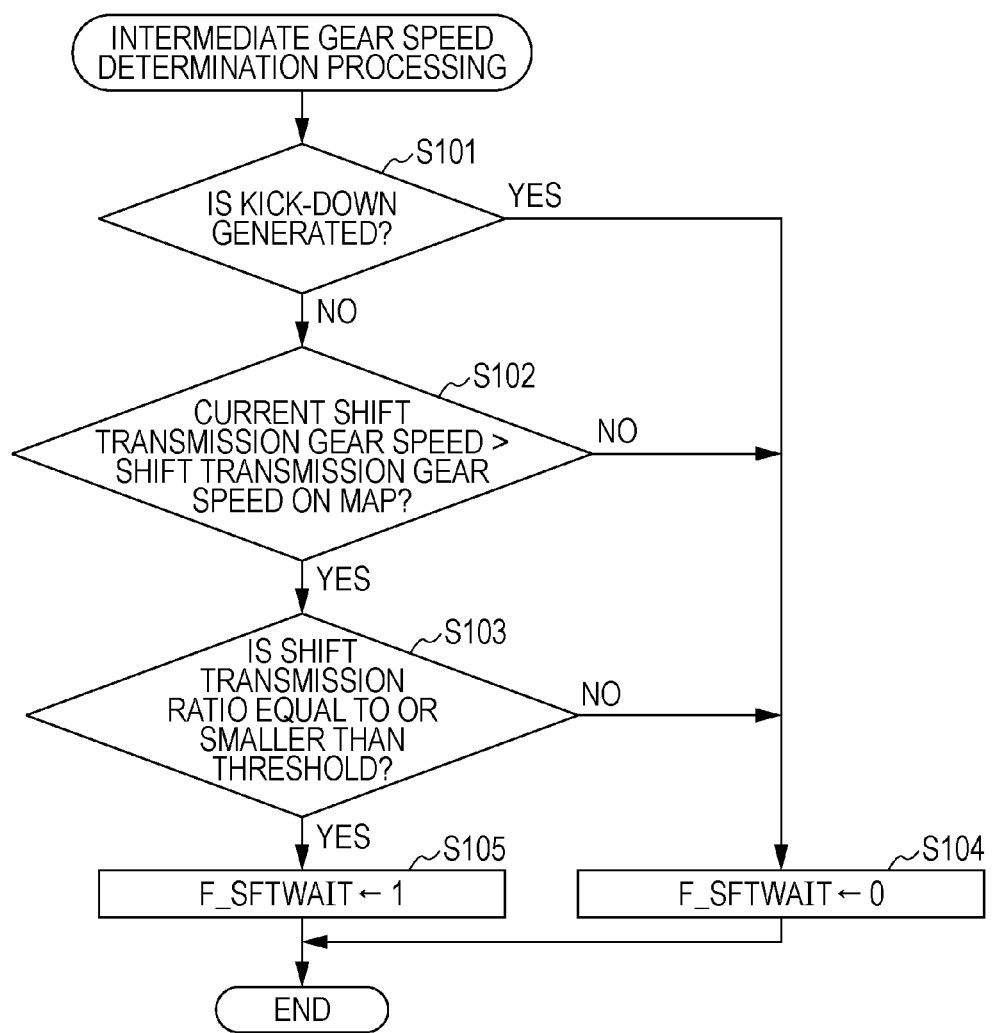
FIG. 9 is a flow chart showing an intermediate gear speed determination processing executed in step S3 in the overall flow of FIG. 8.

Next, an intermediate gear speed determination processing executed in the shift map selection processing in step S3 in the overall flow of FIG. 8 will be described. FIG. 9 is the flow chart showing the intermediate gear speed determination processing executed in step S3. In step S3 of the overall flow, when the shift-transmission shift map is selected, on the basis of the respective down shift lines on the shift-transmission shift map, the intermediate gear speed determination processing is executed.

In the intermediate gear speed determination processing, on the basis of the vehicle speed Nv detected by the vehicle speed sensor 204 and the acceleration pedal opening angle APAT detected by the acceleration pedal opening angle sensor 207, the shift transmission controller 55 of the AT-ECU 5 determines whether or not the kick-down operation is generated (step S101). In a case where it is determined that the kick-down operation is not generated, the shift transmission controller 55 sets the intermediate gear speed determination flag F_SFTWAIT in the memory 56 as 0 (step S104) to end this intermediate gear speed determination processing.

On the other hand, in a case where it is determined that the kick-down operation is generated, in the shift-transmission shift map shown in FIG. 6, the shift transmission controller 55 compares the point immediately before the kick-down operation with the vehicle speed Nv detected in step S101 and the point based on the acceleration pedal opening angle APAT to determine whether or not the current shift transmission gear speed (the current shift transmission gear speed) is larger than the planed shift transmission gear speed on the shift-transmission shift map (the shift transmission gear speed on the map) (step S102). In a case where it is determined that the current shift transmission gear speed is not larger than the shift transmission gear speed on the map, that is, the current shift transmission gear speed is the same as the shift transmission gear speed on the map or the current shift transmission gear speed is smaller than the shift transmission gear speed on the map, the shift transmission controller 55 sets the intermediate gear speed determination flag F_SFTWAIT in the memory 56 as 0 (step S104) to end this intermediate gear speed determination processing.

In a case where it is determined that the current shift transmission gear speed is larger than the shift transmission gear speed on the map, the shift transmission controller 55 further determines whether or not the shift transmission ratio (gear ratio) at a time when the KD shift transmission operation is performed is equal to or smaller than a predetermined threshold (step S103). In a case where it is determined that the shift transmission ratio is larger than the predetermined threshold, the shift transmission controller 55 sets the intermediate gear speed determination flag F_SFTWAIT in the memory 56 as 0 (step S104) to end this intermediate gear speed determination processing.

On the other hand, in a case where it is determined that the shift transmission ratio is equal to or smaller than the predetermined threshold, the shift transmission controller 55 sets the intermediate gear speed determination flag F_SFTWAIT in the memory 56 as 1 (step S105) to end this intermediate gear speed determination processing.

Figure 10:
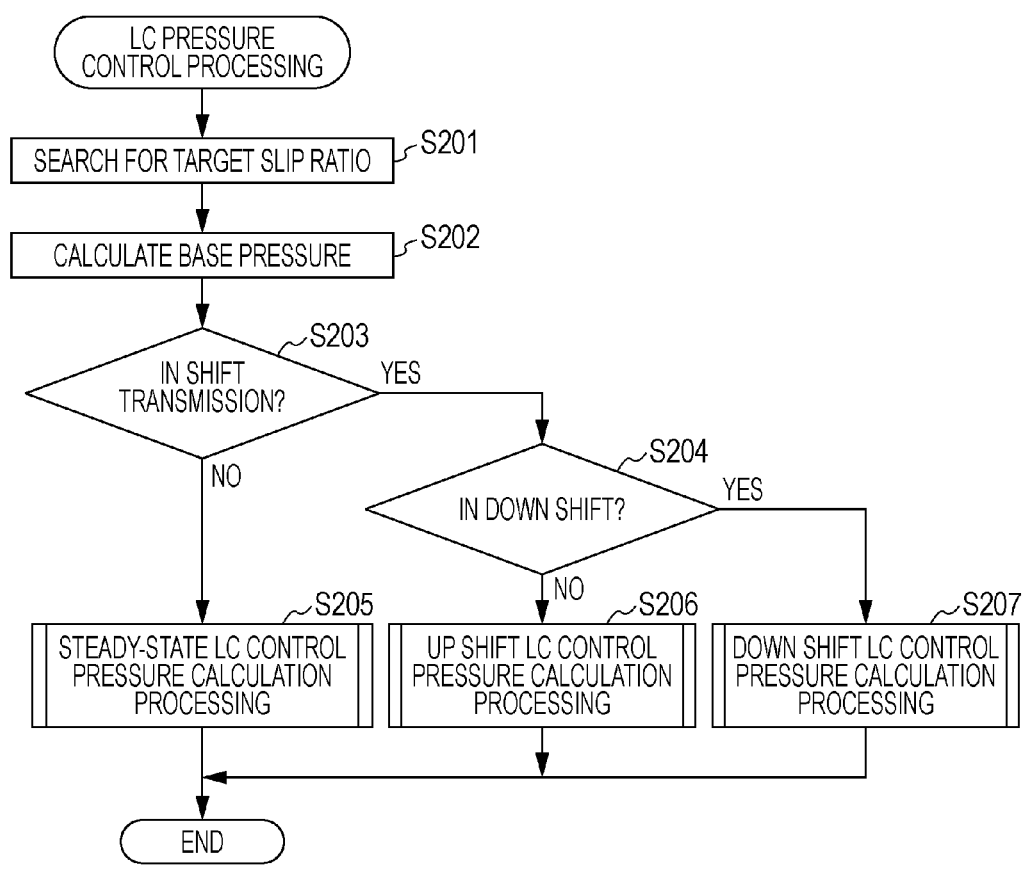
FIG. 10 is a flow chart showing an LC pressure control processing executed in step S8 in the overall flow of FIG. 8.

Next, the LC pressure control processing in step S8 of the overall flow of FIG. 8 will be described. FIG. 10 is a flow chart showing the LC pressure control processing executed in step S8 of the overall flow. This LC pressure control processing is designed to control the overall supply hydraulic pressure of the lock-up clutch 35 on the basis of the LC area determined in step S7 of the overall flow, and the processing is executed by the AT-ECU 5.

In the LC pressure control processing, the AT-ECU 5 searches for a target slip ratio ETRT of the torque converter 3 (step S201). The target slip ratio ETRT of the torque converter 3 is a value searched for on a map in related art by using the revolution number Ni of the main shaft 22 of the automatic transmission 2 and the throttle opening degree TH as search axes, and these maps are exchanged for every shift transmission gear speed. Also, plural types of maps are set in accordance with an operation state of an external load such as an air conditioner.

Subsequently, the AT-ECU 5 calculates a base pressure QLCBASE on the basis of the output torque of the engine 1, the target slip ratio ETRT searched for in step S201, the torque converter characteristic of the torque converter 3, and the capacity characteristic of the lock-up clutch 35 (step S202).

Then, the AT-ECU 5 determines whether or not the automatic transmission 2 is currently in shift transmission on the basis of the gear ratio (step S203). In a case where it is determined that the automatic transmission 2 is not in the shift transmission, the AT-ECU 5 execute a separately set steady-state LC control pressure calculation processing and decides the LC control hydraulic pressure in a steady state (step S205) to end this LC pressure control processing.

On the other hand, in a case where it is determined that the automatic transmission 2 is currently in shift transmission, the AT-ECU 5 subsequently determines whether or not the shift transmission is a DOWN shift (step S204). In a case where it is determined that the shift transmission is not the DOWN shift, the AT-ECU 5 executes a separately set UP shift LC control pressure calculation processing and decides the LC control hydraulic pressure at the time of the UP shift (step S206) to end this LC pressure control processing. Also, in a case where it is determined that the shift transmission is the DOWN shift, the AT-ECU 5 executes a separately set DOWN shift LC control pressure calculation processing and decides the LC control hydraulic pressure at the time of the DOWN shift (step S207) to end this LC pressure control processing.

Figure 11:
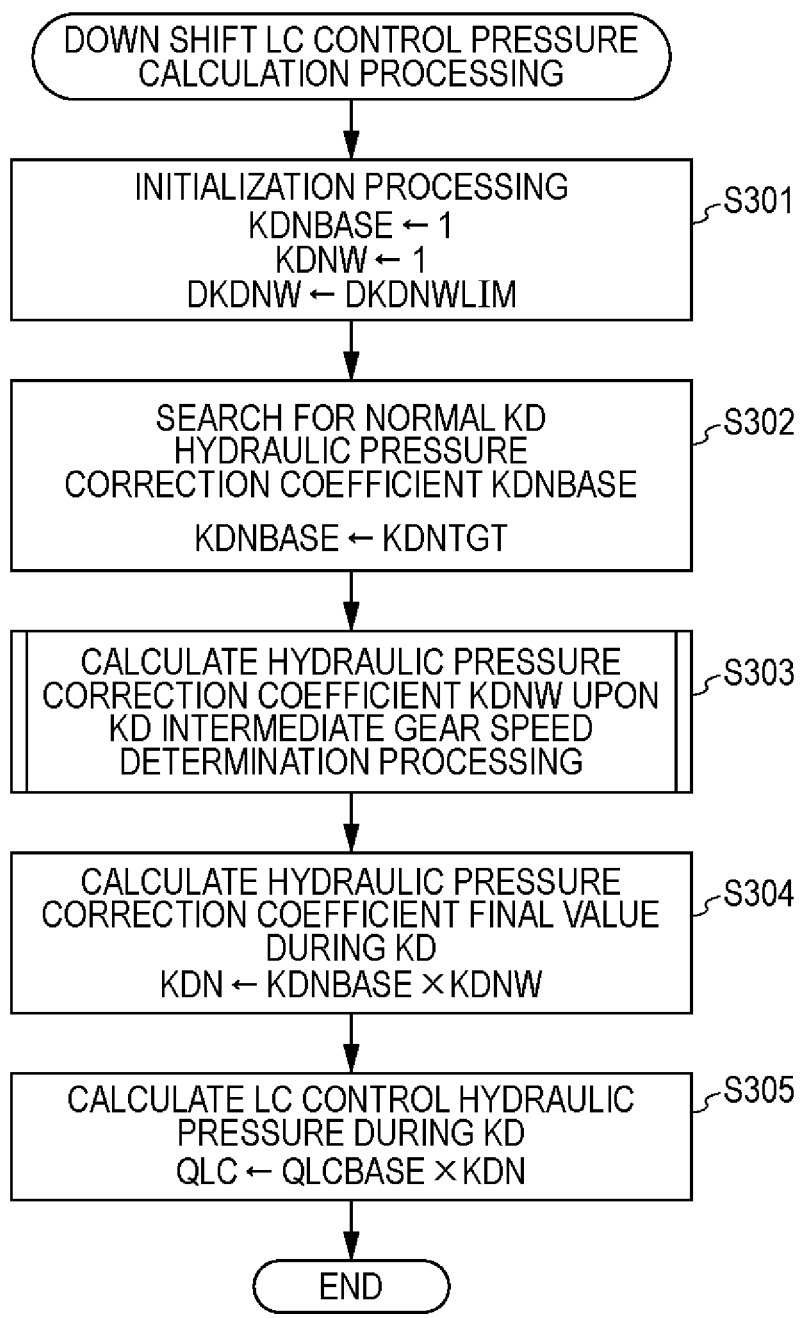
FIG. 11 is a flow chart showing a DOWN shift LC control pressure calculation processing executed in step S207 of the LC pressure control processing of FIG. 10.

As the DOWN shift LC control pressure calculation processing in step S207 is a characteristic part of the embodiment of the present invention, by using a flow chart of FIG. 11 and the block diagram of FIG. 2, a content thereof will be described in detail. FIG. 11 is a flow chart showing a DOWN shift LC control pressure calculation processing executed in step S207 of the LC pressure control processing. According to the present embodiment, in particular, such a processing is performed that while the intermediate gear speed determination processing is performed at the time of the kick-down control, a control is carried out to multiply the necessary lock-up control hydraulic pressure by a coefficient so as to decrease the control hydraulic pressure, and after the end of the intermediate gear speed determination processing, the pressure is gradually returned to the original necessary lock-up control hydraulic pressure in a previously regulated period of time in accordance with the conditions such as the shift transmission gear speed of the jumping KD control.

In the DOWN shift LC control pressure calculation processing, first, the AT-ECU 5 executes an initialization processing (step S301). This initialization processing is performed only once after the start of the shift transmission of the automatic transmission 2. In the initialization processing, first, the AT-ECU 5 sets an LC hydraulic pressure correction coefficient KDNBASE during the normal kick-down control as 1, sets an LC hydraulic pressure correction coefficient KDNW during the KD intermediate gear speed determination processing as 1, and sets the gradual return of FIG. 5, that is, a return amount DKDNW per one processing (one cycle) when the correction coefficient is returned after the KD intermediate gear speed determination processing as a lower limit return amount DKDNWLIM.

Subsequently, the AT-ECU 5 searches for the hydraulic pressure correction coefficient KDNBASE at the time of the normal kick-down control to be set as an LC hydraulic pressure correction coefficient target value KDNTGT during the normal kick-down control (step S302). The LC hydraulic pressure correction coefficient target value KDNTGT is two-dimensional map data of the throttle opening degree TH and the vehicle speed Nv. In the kick-down control according to the present embodiment, these pieces of map data are exchanged for every shift transmission mode, and further-more, the coefficients are switched in the torque phase and the inertia phase in the corresponding kick-down control.

Then, on the basis of a previously set processing (see a flow chart of FIG. 12), the AT-ECU 5 calculates the hydraulic pressure correction coefficient KDNW at the time of the KD intermediate gear speed determination processing (step S303). The flow chart of FIG. 12 will be described below.

Subsequently, the AT-ECU 5 calculates a hydraulic pressure correction coefficient final value KDN during the kick-down control (step S304). To be more specific, the AT-ECU 5 multiplies the LC hydraulic pressure correction coefficient KDNBASE during the normal kick-down control which is searched for in step S302 with the LC hydraulic pressure correction coefficient KDNW during the KD intermediate gear speed determination processing which is calculated in step S303 to calculate this hydraulic pressure correction coefficient final value KDN.

Finally, the AT-ECU 5 calculates an LC control hydraulic pressure QLC during the kick-down control and decides the LC control hydraulic pressure (step S305). To be more specific, the AT-ECU 5 multiplies an LC control reference hydraulic pressure QLCBASE with the LC control hydraulic pressure correction coefficient final value KDN during the kick-down control which is calculated in step S304 to calculate the LC control hydraulic pressure QLC during this kick-down control. Then, the AT-ECU 5 ends this DOWN shift LC control pressure calculation processing.

At this time, the LC control hydraulic pressure QLC finally calculated by the AT-ECU 5 becomes the decided LC control hydraulic pressure. According to the present embodiment, the LC control hydraulic pressure decided in the correction coefficient calculation processing in step S303 is switched. For example, at the time of the start of the kick-down control, the first lock-up control amount changer 531 outputs the decided LC control hydraulic pressure QLC (the KDN 54 torque×the LC control reference hydraulic pressure) to the hydraulic pressure control apparatus 6. Also, when the intermediate gear speed determinator 52 determines that the intermediate gear speed shift transmission instruction is included, the second lock-up control amount changer 532 outputs the decided LC control hydraulic pressure QLC (the KDN intermediate gear speed x the LC control reference hydraulic pressure) to the hydraulic pressure control apparatus 6. Furthermore, when the target speed shift transmission instruction detector 54 detects the shift transmission instruction to the target shift transmission gear speed, the third lock-up control amount changer 533 outputs the decided LC control hydraulic pressure QLC (the correction coefficient during the gradual return (KDNW+DKDNW)×the LC control reference hydraulic pressure) to the hydraulic pressure control apparatus 6 in accordance with the control in which the correction coefficient KDN is gradually set to be closer to 1 in a sub routine in the flow chart of FIG. 12 which will be described below (see FIG. 12).

Figure 12:
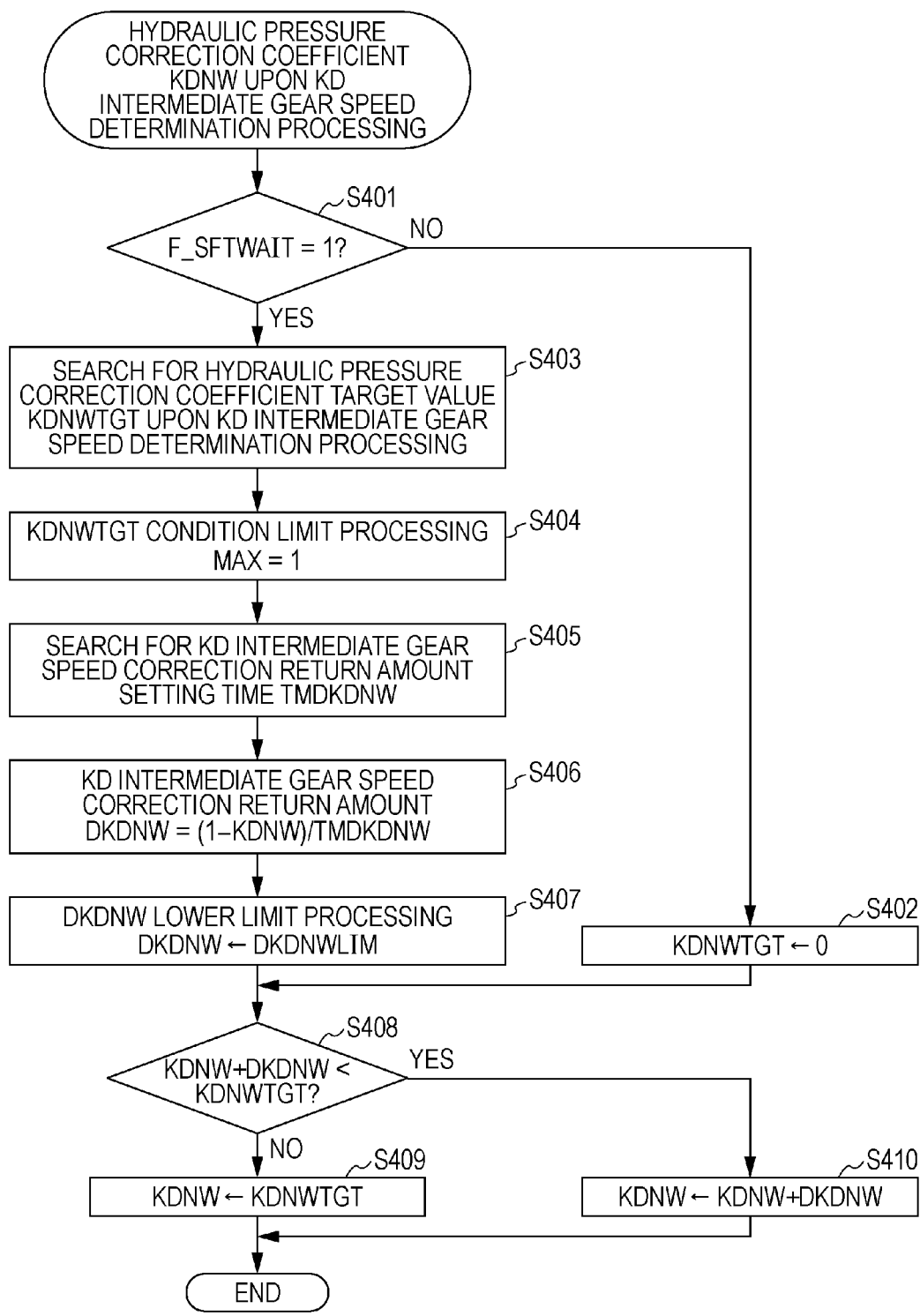
FIG. 12 is a flow chart showing a hydraulic pressure correction coefficient KDNW calculation processing at the time of the KD intermediate gear speed determination in step S303 of the DOWN shift LC control pressure calculation processing of FIG. 11.

Next, a hydraulic pressure correction coefficient KDNW calculation processing at the time of the KD intermediate gear speed determination in step S303 of the DOWN shift LC control pressure calculation processing of FIG. 11 will be described. FIG. 12 is the flow chart showing the hydraulic pressure correction coefficient KDNW calculation processing at the time of the KD intermediate gear speed determination in step S303 of the DOWN shift LC control pressure calculation processing of FIG. 11.

In the present processing, the kick-down instruction detector 51 checks (refers to) the intermediate gear speed determination flag F_SFTWAIT stored in the memory 56 to determine whether or not the intermediate gear speed determination flag F_SFTWAIT is 1, that is, the present flag is turned ON (step S401). In a case where it is determined that F_SFTWAIT is not 1, as the hydraulic pressure correction at the time of the KD intermediate gear speed determination is unnecessary, the AT-ECU 5 sets a hydraulic pressure correction coefficient target value KDNWTGT as 1 (step S402).

On the other hand, in a case where it is determined that F_SFTWAIT is 1, the AT-ECU 5 searches for the hydraulic pressure correction coefficient target value KDNWTGT at the time of the KD intermediate gear speed determination (step S403), sets an upper limit MAX of this KDNWTGT as 1 (step S404), and searches for a return amount setting time TMDKDNW in the KD intermediate gear speed correction (step S405). Then, on the basis of the LC hydraulic pressure correction coefficient KDNW during the KD intermediate gear speed determination processing and the return amount setting time TMDKDNW searched for in step S405, the AT-ECU 5 calculates the KD intermediate gear speed correction return amount DKDNW as shown in the following expression (step S406). DKDNW=(1−KDNW)/TMDKDNW Subsequently, as a lower limit of the KD intermediate gear speed correction return amount DKDNW, the AT-ECU 5 sets the return amount DKDNW per one processing (one cycle) when the correction coefficient is returned after the KD intermediate gear speed determination processing as the lower limit return amount DKDNWLIM (step S407).

Subsequently, the AT-ECU 5 determines whether or not a sum (KDNW+DKDNW) of the LC hydraulic pressure correction coefficient KDNW during the KD intermediate gear speed determination processing and the return amount DKDNW per processing is smaller than the LC hydraulic pressure correction coefficient target value KDNWTGT during the KD intermediate gear speed determination processing (step S408). In a case where it is determined that this sum is equal to or larger than the hydraulic pressure correction coefficient target value KDNWTGT, the AT-ECU 5 sets the LC hydraulic pressure correction coefficient KDNW during the KD intermediate gear speed determination processing as the LC hydraulic pressure correction coefficient target value KDNWTGT (step S409) to end the present processing.

On the other hand, in a case where it is determined that this sum is smaller than the hydraulic pressure correction coefficient target value KDNWTGT, the AT-ECU 5 sets the LC hydraulic pressure correction coefficient KDNW during the KD intermediate gear speed determination as a value obtained by adding the return amount DKDNW per processing to the LC hydraulic pressure correction coefficient KDNW (step S410) to end the present processing.

By performing such a processing, the correction coefficient KDN is gradually returned from the KDN intermediate gear speed for every execution timing for the series of processings at the return amount decided from the relation between the return amount setting time and the KDN 43 inertia. According to this, as it is possible to sufficiently decrease the control hydraulic pressure when the gear ratio passes through the intermediate gear speed, the retard of the engine 1 and the generation of the shift transmission shock during the kick-down control which are the problems in related art can be effectively prevented.

As described above, according to the lock-up control apparatus of the automatic transmission 2 of the embodiment of the present invention (the AT-ECU 5), the lock-up control apparatus 50 for the automatic transmission 2 provided with the lock-up clutch 35 capable of mechanically directly connecting the crankshaft 21 functioning as the input side and the main shaft 22 functioning as the output side of the torque converter 3 in accordance with the lock-up control amount for increasing the lock-up control amount in the predetermined operation area to apply the lock-up clutch 35, includes the kick-down instruction detector 51 for detecting the kick-down shift transmission instruction during the application of the lock-up clutch 35, the first lock-up control amount changer 531 for changing the lock-up control amount when the kick-down shift transmission instruction is detected by the kick-down instruction detector 51, the intermediate gear speed determinator 52 determines whether or not the kick-down shift transmission instruction detected by the kick-down instruction detector is the shift transmission instruction including the intermediate gear speed shift transmission instruction to the intermediate shift transmission gear speed, the second lock-up control amount changer 532 for further changing the lock-up control amount in a case where the intermediate gear speed determinator 52 determines that the kick-down shift transmission instruction includes the intermediate gear speed shift transmission instruction, the target gear speed shift transmission instruction detector 54 detects the target gear speed shift transmission instruction to the target shift transmission gear speed of the kick-down shift transmission instruction from the intermediate shift transmission gear speed determined by the intermediate gear speed determinator 52, and the third lock-up control amount changer 533 for further changing the lock-up control amount when the target gear speed shift transmission instruction is detected by the target gear speed shift transmission instruction detector 54. According to this, in the case of the jumping kick-down control for the plural shift transmission gear speeds where the kick-down instruction includes the intermediate gear speed shift transmission instruction, the processing of returning the control hydraulic pressure to the normal value for every shift transmission by one gear speed is not performed. Therefore, the retard of the engine 1 and the generation of the shift transmission shock during the kick-down control which are the problems in the jumping kick-down control in related art can be effectively prevented. Also, the increase in the number of revolutions Ne of the engine 1 at the time of the kick-down control becomes smooth, and the response of the engine 1 and the automatic transmission 2 can be improved.

According to the lock-up control apparatus of the automatic transmission 2 according to the embodiment of the present invention, in a previously set shift transmission characteristic, the intermediate gear speed determinator 52 may determine whether or not the kick-down shift transmission instruction is the shift transmission instruction including intermediate gear speed shift transmission instruction on the basis of whether or not the kick-down shift transmission instruction is the shift transmission instruction crossing the down shift line including the intermediate shift transmission gear speed.

According to the lock-up control apparatus of the automatic transmission 2 according to the embodiment of the present invention, the target gear speed shift transmission instruction detector 54 may monitor the gear ratio of the automatic transmission 2 and detect the target gear speed shift transmission instruction on the basis of the state in which the gear ratio becomes equal to or smaller than the intermediate shift transmission gear speed.

According to the lock-up control apparatus of the automatic transmission 2 according to the embodiment of the present invention, the third lock-up control amount changer 533 may gradually change the lock-up control amount from the lock-up control amount set by the second lock-up control amount changer 532 to the target lock-up control amount set by the target shift transmission gear speed over the period from the time when the target gear speed shift transmission instruction detector 54 detects the target gear speed shift transmission instruction until the target shift transmission gear speed is reached.

According to the lock-up control apparatus for the automatic transmission of the embodiment of the present invention, in the jumping kick-down control where the kick-down control is performed while crossing the plural shift transmission gear speeds, it is possible to preventing the control problem in related art from occurring in which the control hydraulic pressure decreased for the torque phase when the gear ratio passes through the intermediate shift transmission gear speed is returned to the control hydraulic pressure for the inertia phase. According to this, by further decreasing the control hydraulic pressure when the gear ratio passes through the intermediate shift transmission gear speed, the retard of the engine and the generation of the shift transmission shock during the kick-down control can be effectively prevented. Also, the increase in the number of revolutions of the engine at the time of the kick-down control becomes smooth, and the response of the engine and the automatic transmission can be improved.

In the lock-up control apparatus for the automatic transmission of the embodiment of the present invention, in a previously set shift transmission characteristic, on the basis of whether or not the kick-down shift transmission instruction is a shift transmission instruction crossing a down shift line including the intermediate shift transmission gear speed, the intermediate gear speed determinator (52) may determine whether or not the kick-down shift transmission instruction is a shift transmission instruction including the intermediate gear speed shift transmission instruction.

In the lock-up control apparatus for the automatic transmission of the embodiment of the present invention, the target gear speed shift transmission instruction detector (54) may monitor a gear ratio of the automatic transmission (2) and detect the target gear speed shift transmission instruction on the basis of a state in which the gear ratio becomes equal to or smaller than the intermediate shift transmission gear speed.

In the lock-up control apparatus for the automatic transmission of the embodiment of the present invention, the third lock-up control amount changer (533) may gradually change the lock-up control amount from the lock-up control amount set by the second lock-up control amount changer (532) to the target lock-up control amount set by the target shift transmission gear speed over the time from when the target gear speed shift transmission instruction detector (54) detects the target gear speed shift transmission instruction until the target shift transmission gear speed is reached.

According to the embodiment of the present invention, by further decreasing the control hydraulic pressure when the gear ratio passes through the intermediate shift transmission gear speed, the retard of the engine and the generation of the shift transmission shock during the kick-down control can be effectively prevented.

In the above, the lock-up control apparatus for the automatic transmission of the embodiments of the present invention have been described in detail on the basis of the accompanying drawings, but the present invention is not limited to these configurations. Various modifications can be realized in a scope of the technical idea described in the claims, specification, and drawings. It should be noted that those having a shape, a structure, and a function which are not directly described in the specification and drawings are also within the scope of the technical idea of the present invention as long as the action and the effect of the present invention are attained. That is, the respective units constituting the lock-up control apparatus 50, the AT-ECU 5, or the hydraulic pressure control apparatus 6 of the automatic transmission 2 according to the above-mentioned embodiment can be replaced by those having an arbitrary configuration which may exhibit a similar function. Also, an arbitrary component may be added.

What is claimed is:

1. A lock-up control apparatus for an automatic transmission provided with a lock-up clutch capable of mechanically directly connecting an input side and an output side of a torque converter in accordance with a lock-up control amount that is increased in a predetermined operation area to apply the lock-up clutch, the lock-up control apparatus comprising:
   a kick-down instruction detector configured to detect a kick-down shift transmission instruction during an application of the lock-up clutch;
   a first lock-up control amount changer configured to change the lock-up control amount when the kick-down shift transmission instruction is detected by the kick-down instruction detector;
   an intermediate gear speed determinator configured to determine whether or not the kick-down shift transmission instruction detected by the kick-down instruction detector is a shift transmission instruction including an intermediate gear speed shift transmission instruction to an intermediate shift transmission gear speed;
   a second lock-up control amount changer configured to further change the lock-up control amount in a case where the intermediate gear speed determinator determines that the kick-down shift transmission instruction includes the intermediate gear speed shift transmission instruction;
   a target gear speed shift transmission instruction detector configured to detect a target gear speed shift transmission instruction to a target shift transmission gear speed of the kick-down shift transmission instruction from the intermediate shift transmission gear speed determined by the intermediate gear speed determinator; and
   a third lock-up control amount changer configured to further change the lock-up control amount when the target gear speed shift transmission instruction is detected by the target gear speed shift transmission instruction detector.

2. The lock-up control apparatus for the automatic transmission according to claim 1,
   wherein in a previously set shift transmission characteristic, the intermediate gear speed determinator is configured to determine whether or not the kick-down shift transmission instruction is a shift transmission instruction including the intermediate gear speed shift transmission instruction based on whether or not the kick-down shift transmission instruction is a shift transmission instruction crossing a down shift line including the intermediate shift transmission gear speed.

3. The lock-up control apparatus for the automatic transmission according to claim 2,
   wherein the target gear speed shift transmission instruction detector is configured to monitor a gear ratio of the automatic transmission and to detect the target gear speed shift transmission instruction based on a state in which the gear ratio becomes equal to or smaller than the intermediate shift transmission gear speed.

4. The lock-up control apparatus for the automatic transmission according to claim 3,
   wherein the third lock-up control amount changer is configured to gradually change the lock-up control amount from the lock-up control amount changed by the second lock-up control amount changer to the target lock-up control amount set by the target shift transmission gear speed over a period of time from a time when the target gear speed shift transmission instruction detector detects the target gear speed shift transmission instruction until the target shift transmission gear speed is reached.

5. The lock-up control apparatus for the automatic transmission according to claim 2,
wherein the third lock-up control amount changer is configured to gradually change the lock-up control amount from the lock-up control amount changed by the second lock-up control amount changer to the target lock-up control amount set by the target shift transmission gear speed over a period of time from a time when the target gear speed shift transmission instruction detector detects the target gear speed shift transmission instruction until the target shift transmission gear speed is reached.

6. The lock-up control apparatus for the automatic transmission according to claim 1,
wherein the target gear speed shift transmission instruction detector is configured to monitor a gear ratio of the automatic transmission and to detect the target gear speed shift transmission instruction based on a state in which the gear ratio becomes equal to or smaller than the intermediate shift transmission gear speed.

7. The lock-up control apparatus for the automatic transmission according to claim 6,
wherein the third lock-up control amount changer is configured to gradually change the lock-up control amount from the lock-up control amount changed by the second lock-up control amount changer to the target lock-up control amount set by the target shift transmission gear speed over a period of time from a time when the target gear speed shift transmission instruction detector detects the target gear speed shift transmission instruction until the target shift transmission gear speed is reached.

8. The lock-up control apparatus for the automatic transmission according to claim 1,
wherein the third lock-up control amount changer is configured to gradually change the lock-up control amount from the lock-up control amount changed by the second lock-up control amount changer to the target lock-up control amount set by the target shift transmission gear speed over a period of time from a time when the target gear speed shift transmission instruction detector detects the target gear speed shift transmission instruction until the target shift transmission gear speed is reached.

9. A lock-up control apparatus for an automatic transmission provided with a lock-up clutch capable of mechanically directly connecting an input side and an output side of a torque converter in accordance with a lock-up control amount that is increased in a predetermined operation area to apply the lock-up clutch, the lock-up control apparatus comprising:
kick-down instruction detecting means for detecting a kick-down shift transmission instruction during an application of the lock-up clutch;
first lock-up control amount changing means for changing the lock-up control amount when the kick-down shift transmission instruction is detected by the kick-down instruction detecting means;
intermediate gear speed determinating means for determining whether or not the kick-down shift transmission instruction detected by the kick-down instruction detecting means is a shift transmission instruction including an intermediate gear speed shift transmission instruction to an intermediate shift transmission gear speed;
second lock-up control amount changing means for further changing the lock-up control amount in a case where the intermediate gear speed determinating means determines that the kick-down shift transmission instruction includes the intermediate gear speed shift transmission instruction;
target gear speed shift transmission instruction detecting means for detecting a target gear speed shift transmission instruction to a target shift transmission gear speed of the kick-down shift transmission instruction from the intermediate shift transmission gear speed determined by the intermediate gear speed determinating means; and
third lock-up control amount changing means for further changing the lock-up control amount when the target gear speed shift transmission instruction is detected by the target gear speed shift transmission instruction detecting means.

\* \* \* \* \*